United States Patent [19]
Chatzigianis et al.

[11] Patent Number: 6,065,084
[45] Date of Patent: May 16, 2000

[54] PROGRAMMABLE PACKER AND UNPACKER WITH DITHERER

[75] Inventors: Tony Chatzigianis, San Carlos; Scott Kenneth Pritchett, Fremont, both of Calif.

[73] Assignee: Silicon Graphics, Inc., Mountain View, Calif.

[21] Appl. No.: 08/775,834

[22] Filed: Dec. 31, 1996

[51] Int. Cl.[7] .................................................. G06F 13/40
[52] U.S. Cl. ............................................ 710/127; 710/68
[58] Field of Search .................................... 386/109, 112; 345/202, 443; 395/307, 308, 888, 309

[56] References Cited

U.S. PATENT DOCUMENTS

| | | | |
|---|---|---|---|
| 4,878,166 | 10/1989 | Johnson et al. | 395/307 |
| 5,381,180 | 1/1995 | Keith | 348/396 |
| 5,479,594 | 12/1995 | Lum | 345/443 |
| 5,568,192 | 10/1996 | Hannah | 348/222 |
| 5,590,378 | 12/1996 | Thayer et al. | 395/850 |
| 5,633,654 | 5/1997 | Kennedy, Jr. et al. | 345/114 |
| 5,649,127 | 7/1997 | Hang | 395/307 |
| 5,655,112 | 8/1997 | MacInnis | 395/308 |
| 5,727,112 | 3/1998 | Kellar et al. | 386/52 |
| 5,732,205 | 3/1998 | Astle | 395/131 |
| 5,760,792 | 6/1998 | Holt et al. | 345/509 |

*Primary Examiner*—Glenn A. Auve
*Assistant Examiner*—Paul R. Myers
*Attorney, Agent, or Firm*—Schwegman, Lundberg, Woessner, and Kluth, P.A.

[57] ABSTRACT

A programmable packer and unpacker with dither support is disclosed. In one embodiment of the invention, a packer packs a plurality of bits of a first bus to a lesser plurality of bits of a second bus according to one of a plurality of different packing modes. In another embodiment, an unpacker unpacks a plurality of bits of a first bus from a lesser plurality of bits of a second bus according to one of the plurality of different packing modes. The packer comprises a plurality of multiplexers and a microstore in an exemplary embodiment. The microstore controls the select bits for the plurality of multiplexers, and is programmed in accordance with one of the different packing modes. The multiplexers determine which bits from the input bus will be transferred to the output bus. Because the microstore can be reprogrammed, the packer is programmable and thus universal.

4 Claims, 7 Drawing Sheets

PROGRAMMABLE PACKER AND UNPACKER WITH DITHERER

FIELD OF THE INVENTION

This invention relates generally to a digital packer and unpacker, and more particularly to such a packer and unpacker that is programmable and has a ditherer.

BACKGROUND OF THE INVENTION

With the advent of multimedia, digital video and digital audio applications for computers, the need to move vast amounts of digital data very quickly has become increasingly important. For example, in digital video applications, the input from a video source is digitized, and then sent to a computer for digital processing. If the processing is to occur in real-time, the digital video data must be transferred to the computer at a rate no lesser than that at which it is coming in from the video source. Otherwise, some of the video data will be lost and the subsequent processed digital video will appear jumpy to viewers.

The ability of any particular system to move digital data very quickly is exacerbated by the mismatch in bus sizes typically encountered between a multimedia, digital video or digital audio device and a computer. For example, a common specification for digital video calls for a fifty-bit bus, while a PCI bus found on many advanced computers is thirty-two bits in width. The digital data thus must be able to be moved from a fifty-bit bus to a thirty-two-bit bus, and vice-versa, which is difficult in light of the fact that neither bus has a bit width that is a multiple of the width of the other bus.

Another problem is that the format of the input data may be in a different format than is required by the output data. Digital data representing a pixel is typically broken into the constituent color components of that pixel, such as Y, U, V, and A (alpha), or R, G, B, and A (alpha). Each of these components for a particular data format typically has the same number of bits, although other formats specify that the A (alpha) component have less bits than the other components. For example, in one common input data format, each of the components has thirteen bits, or fifty-two bits per pixel (thirteen bits each for of the Y, U, V, and A (alpha) components), while in one particular output data format, each of the components has sixteen bits, or sixty-four bits per pixel. In such instances, the packer must therefore include, or "stuff," extra bits into the output pixels, either at the most significant or least significant end of each pixel's color components. In another common input data format, each of the Y, U, and V components has thirteen bits, while the A (alpha) component has eleven bits.

Furthermore, there is no guarantee that the data on the incoming bus will always be in a particular format, nor that the data on the outgoing bus should always be formatted in accordance with another particular format. That is, the packer may have to contend with many different "packing modes." A packing mode refers to a set of a particular input data format together with a particular output data format. For example, the packing mode described above has an input data format in which each pixel has fifty-two bits (or fifty bits, if the A component only has eleven bits) and an output data format in which each pixel has sixty-four bits. Another packing mode frequently encountered is an input data format in which each pixel has forty bits (ten bits per color component) and an output data format in which each pixel also has forty bits.

Finally, the data on the input bus (i.e., the fifty-bit bus) frequently must be dithered, or otherwise a moire pattern may result when viewing the subsequent processed digital video. Dithering introduces a random element into the digitized video data, so that the patterns that typically cause a moire pattern are broken up sufficiently to prevent the phenomenon from occurring. While dithering may be accomplished at any step during the processing of digital video data, it is convenient and desirable to do so during the packing of data from one bus to another.

Therefore, there is a need for a packer that is programmable in that it is able to pack data on a first bus in any one particular format to a second bus in any other particular format, where the first bus has more bits than the second bus. In other words, the packer should be able to support a plurality of different packing modes. There is a further need for an unpacker that is also programmable, and that can unpack packed data from the second bus to the first bus, also in accordance with a variety of different packing modes. Finally, there is a need for a packer that also dithers data as it packs the data from one bus to another.

SUMMARY OF THE INVENTION

The present invention relates to a digital packer and unpacker that is programmable and has a ditherer. A programmable packer is described that is capable of packing the bits of a first bus to the bits of a second bus, according to any one of a plurality of different packing modes. A programmable unpacker is described that is capable of unpacking the bits of a first bus from the bits of a second bus, also according to any one of a plurality of different packing modes. Also described is a programmable packer that includes a ditherer to dither the bits of the first bus as the packer packs the bits of the first bus to the bits of the second bus.

In an exemplary embodiment of the invention, the programmable packer includes a plurality of multiplexers and a microstore. Each multiplexer has an output bit coupled to a corresponding bit of the second bus, and a plurality of input bits coupled and corresponding to at least the bits of the first bus. The microstore has a set of at least one microinstruction, the set of microinstructions corresponding to one of the different packing modes, and each microinstruction including select bits for the multiplexers. The multiplexers, as programmed by the set of microinstructions of the microstore, pack data from the first bus to the second bus.

Because the microstore can be reprogrammed with a different set of microinstructions, the packer is capable of handling different packing modes for packing the bits of the first bus to the bits of the second bus. This is a distinctive advantage of the present invention. The packer is general purpose, and can be used to pack data from the first bus to the second bus regardless of the format of the input data or the format of the output data. Other advantages, embodiments and aspects of the invention will become apparent by reference to the drawings, and by reading the following description.

DETAILED DESCRIPTION OF THE INVENTION

The present invention relates to a digital packer and unpacker that is programmable and has a ditherer. In the following detailed description, reference is made to the accompanying drawings which form a part hereof, and in which is shown by way of illustration specific embodiments in which the invention may be practiced. It is to be understood, however, that other embodiments may be utilized and structural changes may be made without departing from the scope of the present invention.

The detailed description is organized into four sections. An overview of the present invention is first provided, which describes a system for interfacing a digital video device to a memory in conjunction with which the invention may be implemented, as well as a computer in conjunction with which the invention may be implemented. A description of packing modes and data formats is provided next, which outlines the nomenclature used in conjunction with specific data formats, as well as the modes and formats supported by an exemplary embodiment of the invention. Next, a description of an exemplary functionality of the invention is provided; specifically, the packing of data from a first bus to a second bus over three clock cycles is discussed step by step. Next, a description of an exemplary structural embodiment of the present invention is provided, as well as the manner in which the embodiment effectuates the described functionality of the previous section. Finally, a description of an exemplary manner by which the code for the microstore is produced is provided.

Overview of the Present Invention

The present invention as is described herein is shown by way of example in conjunction with and as a part of a system for interfacing a digital video device with a memory. The invention, however, is not so limited, and is applicable to any environment or system in which the packing and unpacking from a first bus to a second bus having a different number of bits than the first bus is desirable or necessary. For example, the packer and unpacker of the invention described herein is applicable to other multimedia applications, such as audio applications. The packer and unpacker of the invention may also be applied outside the multimedia domain altogether. Such applications include transfer of data from a hard disk drive to a memory.

Figure 1A:
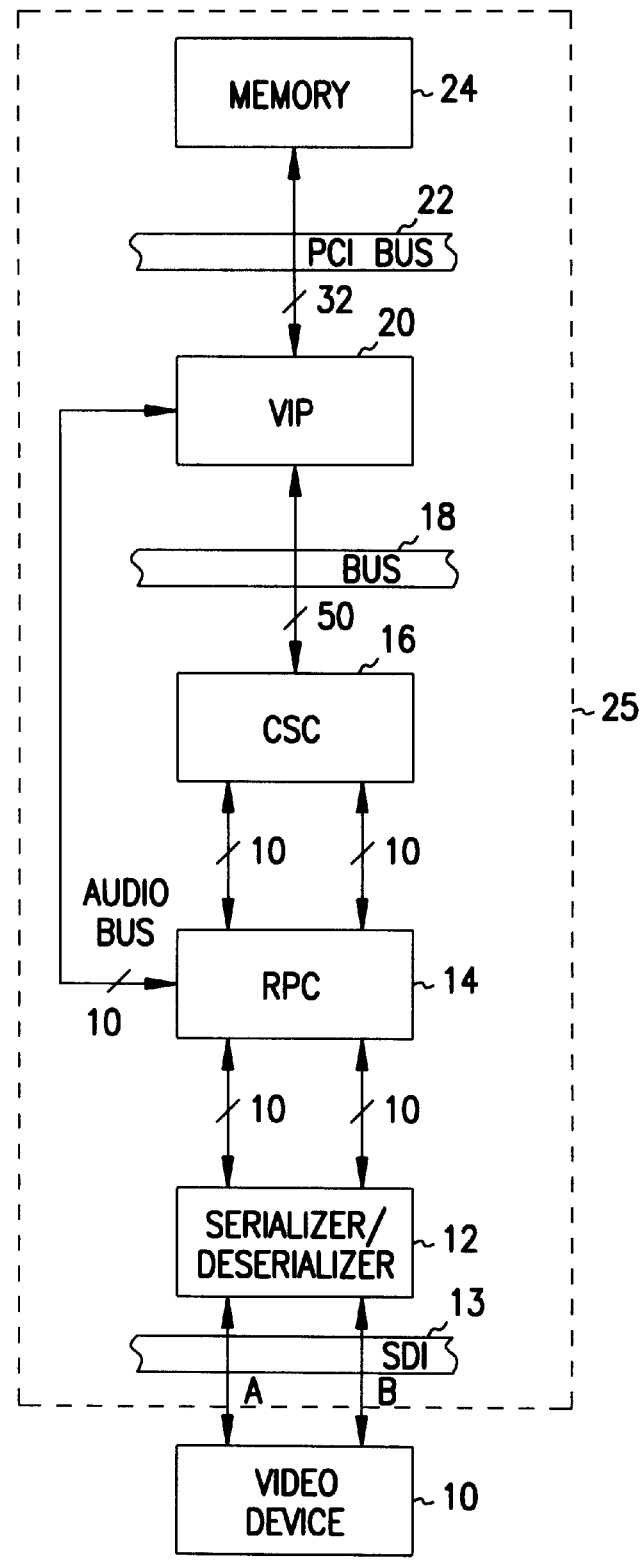
FIG. 1(a) is a block diagram of a typical system in conjunction with which the present invention may be implemented.
Figure 1B:
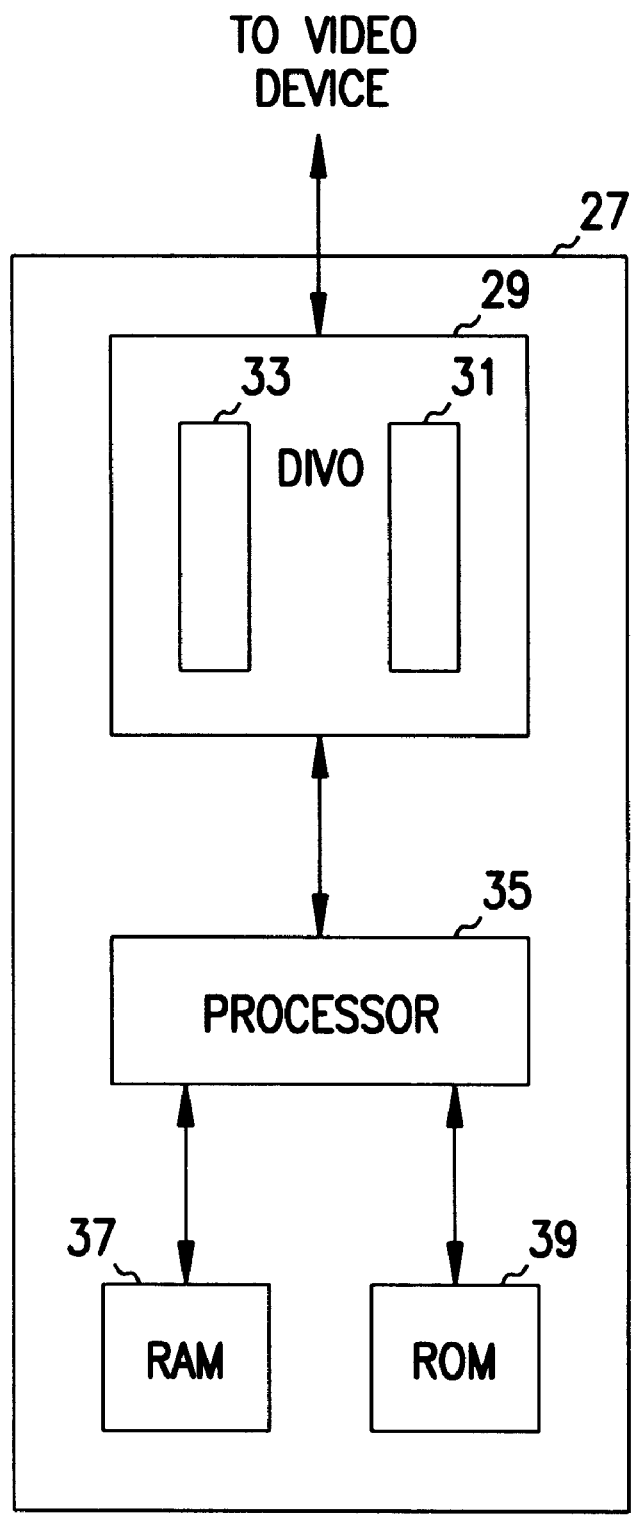
FIG. 1(b) is a block diagram of a typical computer in conjunction with which the present invention may be implemented.

Referring now to FIG. 1 (a), a block diagram of a typical system in conjunction with which the present invention may be implemented is shown. Video device 10 produces a video signal having color component outputs Y, U, V and A (alpha). Although these are typical outputs found in a video environment, the invention is not so limited, and may equally apply to a video device having R, G, B and A (red, green, blue, and alpha respectively) components as well, without departure from the scope thereof. Video device 10 is operatively coupled to serializer/deserializer 12 via serializer digital interface (SDI) 13. Video device 10 provides serializer/deserializer 12 with two links of video data, called link A and link B, over which the color components of the video signal are sent.

Serializer/deserializer 12 serializes the video from the two links, and then deserializes them into two output streams of data, such that each stream is ten bits wide. As shown in FIG. 1(a), video device 10 provides video signals at each of link A and link B which are digital, such that video device 10 is directly coupled to SDI 13. However, the invention is not so limited. Should video device 10 provide analog signals, a digitizer between video device 10 and SDI 13 is necessary to digitize the analog signals into digital signals. In either situation, serializer/deserializer 12 is operatively coupled to RPC 14, which receives the two ten-bit output streams of data from serializer/deserializer 12.

RPC (raster processor chip) 14 is a field programmable gate array (FPGA), which is configured with different microcode to support various functionality. In a video mode, RPC 14 extracts embedded audio from the incoming streams of data, and autophases the two streams (representing links A and B) if they are out of phase. RPC 14 also handshakes with VIP 20 to transfer video data through CSC 16 to VIP 20, and audio data directly to VIP 20. RPC 14 embeds audio into the video stream if desired. For purposes of the present invention, the functionality of RPC 14 is that it extracts audio data from the incoming data streams, so that only video data is sent to CSC 16, to which RPC 14 is operatively coupled.

CSC 16 is a color space converter. It breaks the video signal received as a two ten-bit wide signals from RPC 14 into constituent color components for each pixel of the signal. The output of CSC 16 is also a fifty-bit-wide signal, which passes through bus 18 to VIP 20. Bus 18 is a fifty-bit bus, to which VIP 20 is operatively coupled. VIP 20 is a video interface processor, which is a custom ASIC. Included within VIP 20 is a packer circuit and an unpacker circuit. The packer circuit takes data from bus 18 and packs it onto PCI bus 22, to which VIP 20 is operatively coupled, while the unpacker circuit takes data from PCI bus 22 and unpacks it onto bus 18. (Other functionality of VIP 20 is that it includes a thirty-two-bit interface with three separate DMA engines which transfer video, audio and VITC data to and from memory, and provides for lossless compression.)

PCI bus 22 is a thirty-two bit bus, and thus has a lesser number of bits than does bus 18. A PCI bus is a typical bus architecture used by computers, as those of ordinary skill within the art understand. Memory 24 is an exemplary computer component that accesses PCI bus 22 to store the data packed by the packer of VIP 20. Other computer components, such as a processor, may also access the bus. In one embodiment, for example, PCI bus 22 couples a link, to which a memory, a processor, or other devices or components, can access the PCI bus.

SDI 13, serializer/deserializer 12, RPC 14, CSC 16, bus 18, VIP 20, PCI bus 22, and memory 24 are components of what is known as a "video pipe," labeled as video pipe 25 in FIG. 1(a). A video pipe transfers digitized video data very quickly. The packer and the unpacker described herein are a part of a component of the video pipe, and assist in the transfer of digitized video data. In an exemplary embodiment of the invention, two video pipes reside on a digital interface video option (DIVO) hardware card, for insertion into an appropriate slot of a computer.

This is shown on a general level in FIG. 1 (b), which is a block diagram of a computer in conjunction with which the present invention may be implemented. Computer 27 includes DIVO card 29, which has included therein video pipes 31 and 33. DIVO card 29 is operatively coupled to processor 35, which is itself operatively coupled to random-access memory (RAM) 37 and read-only memory (ROM) 39. Thus, DIVO card 29 acts to provide computer 27 with the capability to access a video device. The present invention is not limited as to the type of computer in conjunction with which it may be implemented. However, in an exemplary embodiment, the computer is an Origin 2000, which is available from Silicon Graphics, Inc., of Mountain View, Calif. The Origin 2000 is scalable, and thus may include more than one processor, and different amounts and types of RAM and ROM. However, in one configuration, the computer has one R10000 processor, and 256 megabytes of RAM.

Packing Modes and Data Formats

A packing mode refers to a set of a particular input data format of the data on an input bus (such as bus 18 of FIG. 1) together with a particular output data format of the data on an output bus (such as PCI bus 22 of FIG. 1). The present invention is programmable, such that it can handle any of a number of different packing modes, and therefore is not limited to any particular packing mode or modes. A data format is called out with a particular nomenclature, such as the input data format 4:4:4:4_13. This means that each of the Y, U, V, and A (alpha) color components of the incoming digital video data is thirteen bits wide, and arrives at the bus according to the matrix:

$$\begin{bmatrix} Y_1 & Y_2 & Y_3 & Y_4 \\ U_1 & U_2 & U_3 & U_4 \\ V_1 & V_2 & V_3 & V_4 \\ A_1 & A_2 & A_3 & A_4 \end{bmatrix}.$$

Each column of Y, U, V, and A represents a complete pixel of data. Thus, each pixel has a unique Y, U, V and A color component, and has fifty-two bits (thirteen bits for each color component, times four components). Note that in another embodiment, the A color component only has eleven bits, and therefore each pixel has fifty bits.

However, other data formats do not have unique color components for every pixel of data. For example, another input data format is 4:2:2:4_8. This means that each of the Y, U, V, and A (alpha) color components of the incoming digital video data is eight bits wide, and arrives at the bus according to the matrix:

$$\begin{bmatrix} Y_1 & Y_2 & Y_3 & Y_4 \\ U_1 & x & U_3 & x \\ V_1 & x & V_3 & x \\ A_1 & A_2 & A_3 & A_4 \end{bmatrix}.$$

The lower-case x specifies that there is no unique value for that particular color component of that pixel, but rather the component has a value equal to the value of the corresponding color component of the previous pixel. Thus, the U color component of the second pixel has the same value as the U color component of the first pixel. Since the data for each successive set of two pixels includes six color components of eight bits each, each pixel on average is twenty-four bits in width.

Other data formats do not have all four color components, for any pixel. For example, a data format of 4:2:2_8 specifies that there are three color components, Y, U and V, but no A (alpha) color component. Each of the Y, U and V color components has eight bits. Furthermore, as in the 4:2:2:4_8 data format already discussed, each U and V color component is applicable to two consecutive pixels. The number of bits needed to specify two pixels is therefore eight times two (two Y components, each at eight bits), plus eight (one U component), plus eight (one V component), for a total of thirty-two bits. Thus, each pixel has an average of sixteen bits.

The present invention is not limited in support of any particular packing mode or modes. However, in an exemplary embodiment of the invention, the packer and unpacker support the following packing modes:

| Unpacked data format | Packed data format | bits/pixel (packed) |
|---|---|---|
| 4:4:4:4_13 | 4:4:4:4_16 | 64 |
| 4:4:4:4_10 | 4:4:4:4_10 | 40 |
| 4:4:4:4_8 | 4:4:4:4_8 | 32 |
| 4:4:4_10 | 4:4:4_10 | 30 |
| 4:2:2:4_10 | 4:2:2:4_10 | 30 |
| 4:2:2:4_8 | 4:2:2:4_8 | 24 |
| 4:2:2_8 | 4:2:2_8 | 16 |
| 4:x:x_8 | 4_8 | 8 |
| 4:x:x_4 | 4_4 | 4 |

Note that the data formats 4:x:x_4 and 4:x:x_8 refer to formats in which only the Y component (i.e., luminance or luma) is significant, and in which the U and V components are not used. In other words, these formats are black and white only, and do not include any chromaticity information.

Exemplary Functionality of the Present Invention

An exemplary functionality of the present invention is a packing mode having an input data format of 4:4:4:4_10 and an output data format of 4:4:4:4_10. This means that each input pixel of data has ten bits for each of its Y, U, V and A (alpha) components, for a total of forty bits. The input data arrives at an input bus (i.e., bus 18 of FIG. 1 (a), which has fifty bits). The packer (i.e., the packer which is a part of VIP 20 of FIG. 1 (a)) packs the input data to an output bus (i.e., PCI bus 22 of FIG. 1(a), which has thirty-two bits). The data is packed to the output bus also in a format in which each pixel of data also has ten bits for each of its Y, U, V and A (alpha) components, for a total of forty bits.

In the case where the input bus is fifty bits in width, and the output bus is thirty-two bits in width, since each pixel of data has forty bits, data for more than one pixel can reside on the input bus at any one time, while only part of the data for one pixel can reside on the output bus at any one time. Two clock cycles are therefore required to completely pack an input word of data (i.e., for a pixel of forty bits) onto an output bus. In the first clock cycle, thirty-two bits are packed onto the output bus, and then in the second clock cycle, the remaining eight bits are packed. Furthermore, 1.6 clock cycles are required for the output word of data (i.e., for a pixel of forty bits) to be completely packed from the input bus. This is because in two particular clock cycles, over which the output bus has a capacity for sixty-four bits, only forty bits are packed; sixty four divided by forty is 1.6.

Figure 2A:
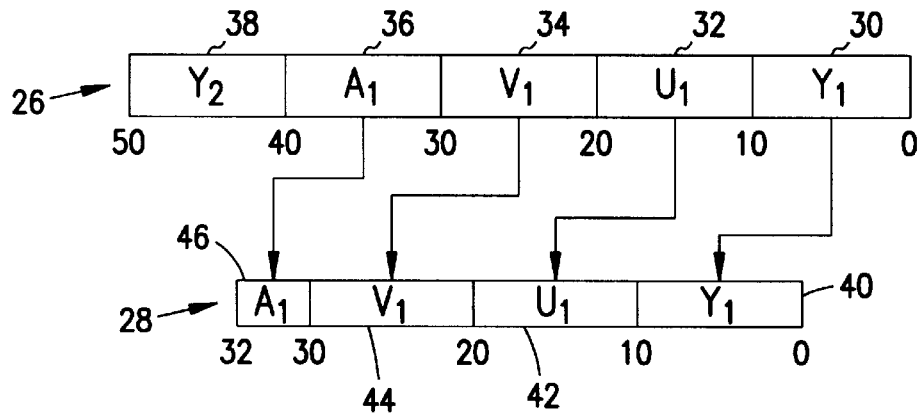
FIG. 2(a) is a block diagram of an input bus and an output bus for a given clock cycle, showing exemplary functionality of an embodiment of the present invention.
Figure 2B:
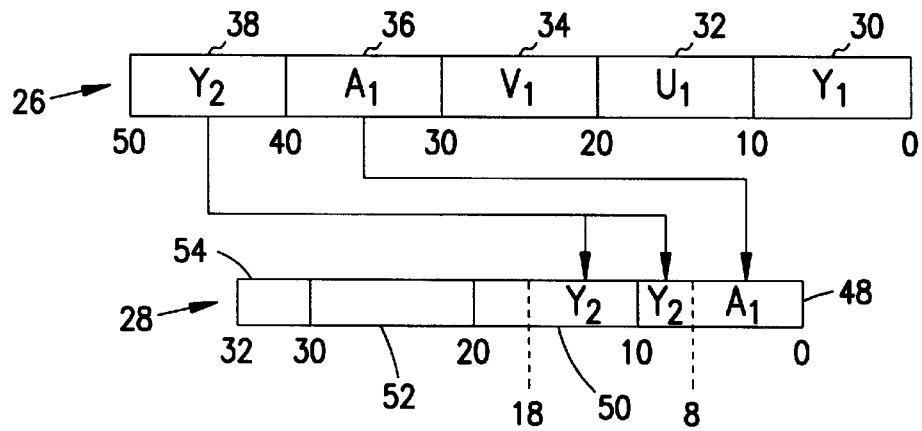
FIG. 2(b) is a block diagram of the input bus and the output bus of FIG. 2(a) in a successive clock cycle to that of FIG. 2(a)
Figure 2C:
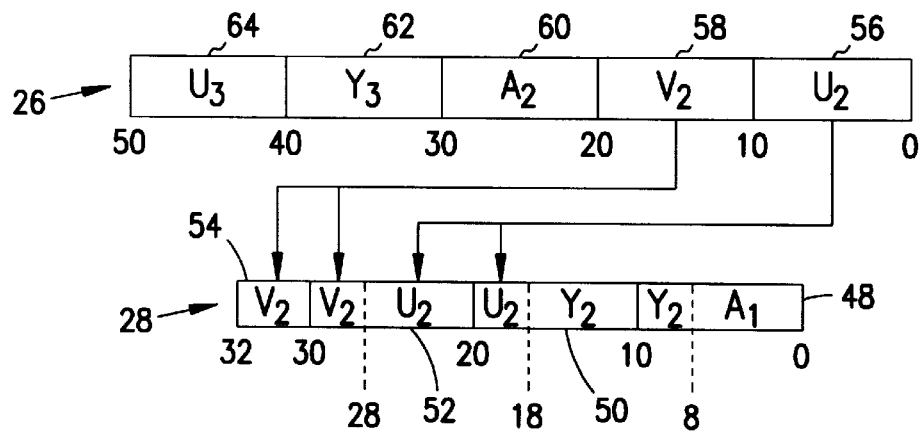
FIG. 2(c) is a block diagram of the input bus and the output bus of FIG. 2(a) in a successive clock cycle to that of FIG. 2(b)

The packing of data from an input bus of fifty bits to an output bus of thirty-two bits over three successive clock cycles is illustrated by reference to FIG. 2(*a*), FIG. 2(*b*), and FIG. 2(*c*). Referring now to FIG. 2(*a*), a block diagram of the input bus and an output bus in a given clock cycle is shown. Input bus 26 has fifty bits, and is divided into ten-bit sections 30, 32, 34, 36 and 38. The Y component of pixel one is loaded in section 30; the U component of pixel one is loaded in section 32; the V component of pixel one is loaded in section 34; the A component of pixel one is loaded in section 36, and the Y component of pixel two is loaded in section 38. Output bus 28 has thirty-two bits, and is divided into ten-bit sections 40, 42 and 44, and two-bit section 46. As shown in FIG. 2(*a*), in this particular clock cycle, the packer has loaded the Y component of pixel one from section 30 of bus 26 to section 40 of bus 28, the U component from section 32 to section 42, and the V component from section 34 to section 44. The packer has also loaded only the first two bits of the A component of section 36 of bus 26 to section 46 of bus 28.

Because bus 28 is now full, the data from bus 28 is copied into a memory component (such as memory 24 as shown in FIG. 1), or is otherwise utilized, and the bus is cleared in the next clock cycle. This is shown in FIG. 2(*b*), which is a block diagram of the input bus and the output bus of FIG. 2(*a*), in a successive clock cycle. Referring now to FIG. 2(*b*), bus 26 still is divided into sections 30, 32, 34, 36 and 38 such that the Y component of pixel one is loaded into section 30, the U component of pixel one is loaded into section 32, the V component of pixel one is loaded into section 34, the A component of pixel one is loaded into section 36, and the Y component of pixel two is loaded into section 38.

However, bus 28 has been cleared of its data as had been shown in FIG. 2(*a*). The packer has now in this second clock cycle instead loaded different data into bus 28, which is divided into ten-bit sections 48, 50 and 52, and two-bit section 54. The packer has loaded the eight bits of the A component of pixel one from section 36 of bus 26 into the first eight bits of section 48 of bus 28. Note that these are the eight bits of the A component of pixel one which were not loaded into bus 28 in the clock cycle shown in FIG. 2(*a*). The packer also has loaded the Y component of pixel two from section 38 of bus 26 into the remaining two bits of section 52 and into the first eight bits of section 50. In this clock cycle, the packer does not load anything into the remaining two bits of section 50, nor into sections 52 or 54, because it has now completely packed all the information on bus 26 onto bus 28, over two clock cycles.

Therefore, in the clock cycle successive to that of FIG. 2(*b*), bus 26 is cleared and more (new) information is loaded onto bus 26 for packing onto bus 28. Note that because bus 28 is not yet full, it is not cleared in this successive clock cycle—the feedback bit is used to hold the eight bits of the A component and the ten bits of the Y component. This is shown in FIG. 2(*c*), which is a block diagram of the input bus and the output bus of FIG. 2(*a*), in a successive clock cycle to that of FIG. 2(*b*). Referring now to FIG. 2(*b*), bus 26 is divided into ten bit sections 56, 58, 60, 62 and 64. New information has been loaded onto bus 26. The U component of pixel two has been loaded into section 56, and thus starts from where the previously information on bus 26 had left off. The V component of pixel two has been loaded into section 58; the A component of pixel two has been loaded into section 60; the Y component of pixel three has been loaded into section 62, and the U component of pixel three has been loaded into section 64.

Bus 28 in the third clock cycle as shown in FIG. 2(*c*) continues to have the A component of pixel one loaded into section 48, and the Y component of pixel two loaded into section 48 and 50, as has been already described in conjunction with FIG. 2(*b*). Therefore, in the third clock cycle, the packer loads the first two bits of the U component of pixel two from section 56 of bus 26 to the last two bits of section 50 of bus 28, the last eight bits of the U component of pixel two from section 56 to the first eight bits of section 52, the first two bits of the V component of pixel two from section 58 to the last two bits of section 52, and the next two bits of the V component of pixel two from section 58 to the two bits of section 54. Bus 28 is then full, and is copied by a memory or other device as had been done at the end of the clock cycle of FIG. 2(*a*), as already described.

This exemplary functionality continues indefinitely, until there is no more information in an input buffer that can be loaded onto bus 26 and packed onto bus 28. In an exemplary embodiment of the invention, the packer operates at 33 MHZ. Depending on the packing mode used, the data output rate of the packer (the rate at which data is packed onto the output bus) can go as fast at the PCI burst rate, which is equal to 132 MB/sec. In other words, the packer can saturate the PCI bandwidth.

For unpacking, the unpacker takes data packed from the fifty-bit bus (which becomes the input bus for unpacking), and unpacks into onto the thirty-two bit PCI bus (which becomes the output bus for unpacking), in a manner reverse to that as has been described. Once again, depending on the packing mode used, the input drain rate (the rate at which the unpacker can "drain" data from an input buffer) can go as fast as the PCI burst rate. Thus, as long as the tunpacker is never stalled because a buffer coupled to the fifty-bit output bus is full, little or no buffering is required on the PCI bus side.

Exemplary Structural Embodiment of the Present Invention

Figure 3A:
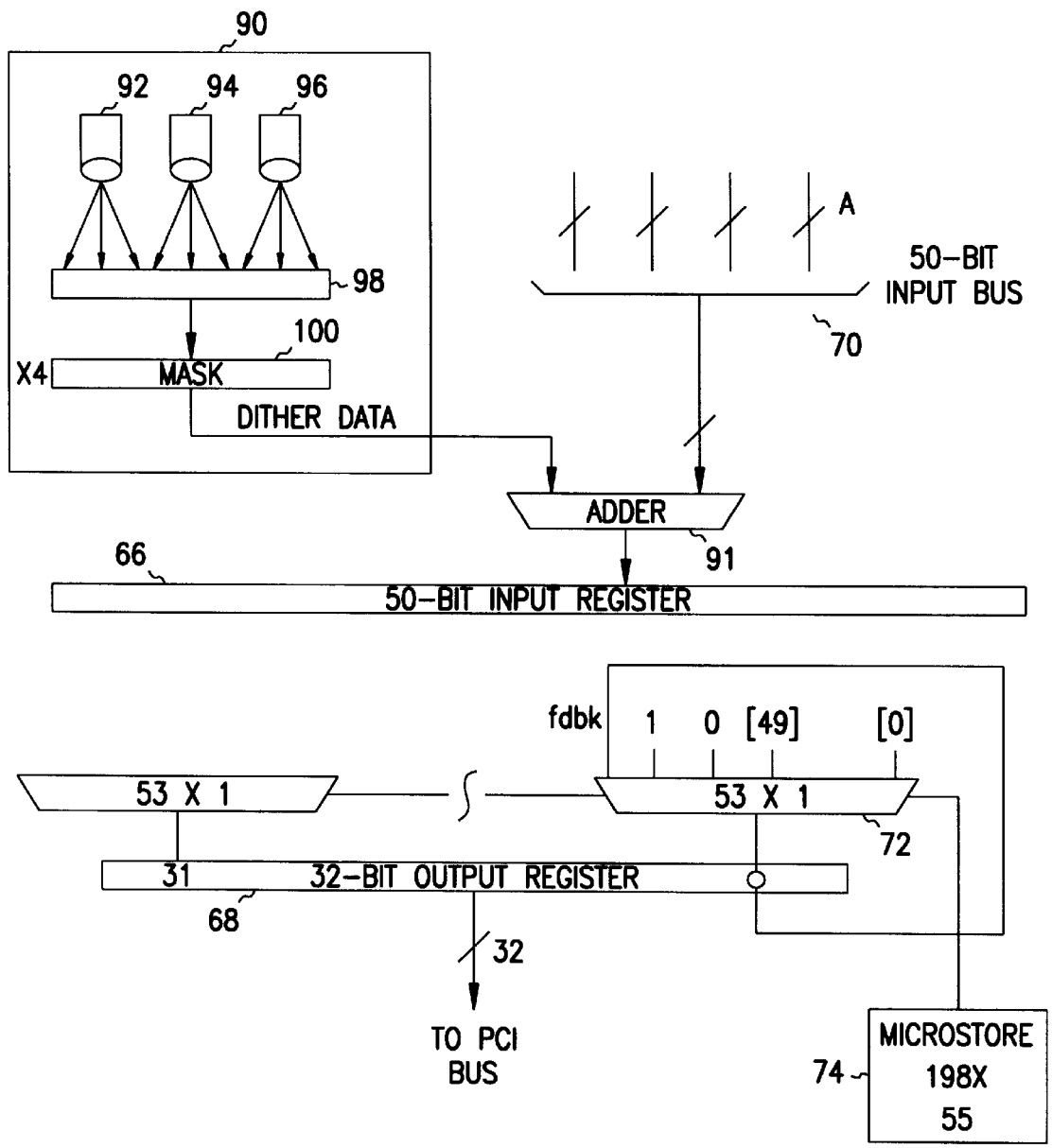
FIG. 3(a) is a block diagram of an exemplary structural embodiment of a programmable packer according to the present invention.
Figure 3B:
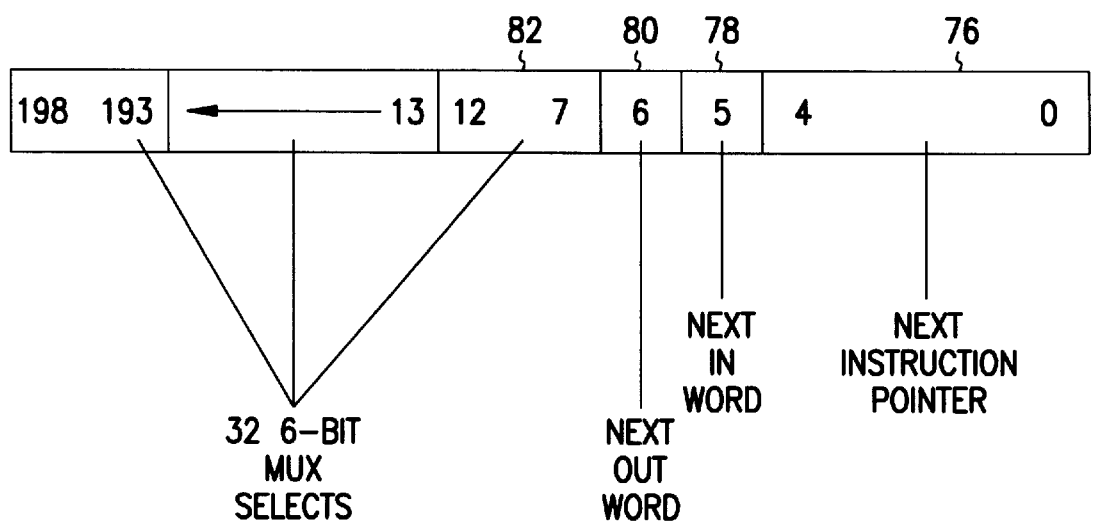
FIG. 3(b) is a diagram of a microinstruction for the microstore of the packer of FIG. 3(a)

In an exemplary structural embodiment of the invention, a programmable packer capable of packing the bits of a first bus to the bits of a second bus according to any one of a plurality of different packing modes is implemented as is shown in FIG. 3(*a*). Referring now to FIG. 3(*a*), the packer packs data from fifty-bit input register 66 to thirty-two bit output register 68. Fifty-bit input register 66 is coupled to fifty-bit input bus 70, which is comparable and corresponds to bus 18 of FIG. 1. As has been discussed, fifty-bit input bus 70 has loaded on it digital video data, including the Y, U, V and A (alpha) color components of a succession of pixels. Thirty-two bit output register 68 is coupled to a thirty-two bit PCI bus (such as PCI bus 18 of FIG. 1).

The operation of the packer of FIG. 3(*a*) conforms to that described in conjunction with the exemplary functionality of the present invention. In a given clock cycle, the packer packs data from register 66 to register 68. It loads new data from bus 70 to register 66 when the data already on bus 70 has been completely packed to bus 68. Furthermore, the packer sends data from register 68 to the PCI bus when register 68 is full. Thus, the packer transfers data from fifty-bit bus 70 to the thirty-two bit PCI bus, accounting for the different bit widths of the two buses, and also accounting for any difference in input data format of the data received on bus 70 and output data format of the data to be sent over the PCI bus.

The packer accomplishes this via multiplexers 72. There is one multiplexer for each bit of output register 68 (i.e., for each bit of the PCI bus). Thus, for the exemplary embodiment of FIG. 3(*a*), there are thirty-two multiplexers 72. Each of multiplexers 72 has its output bit coupled to a corresponding bit of output register 68. The input bits of each of multiplexers 72 is coupled to each of the bits of fifty-bit register 66. Other input bits of each of multiplexers 72 couple to a constant logic one, a constant logic zero, and a feedback of the output of register 68, so that the output of the multiplexer in one clock cycle serves as an input to the multiplexer in a successive clock cycle. Thus, there are a total of fifty-three inputs to each of the multiplexers.

Each of multiplexers 72 has its select bits coupled to microstore 74. Microstore 74 is implemented as a random-access memory within the VIP (i.e., VIP 20 of FIG. 1). As understood by those of ordinary skill within the art, the select bits of the multiplexers control which of the input bits of a multiplexer pass through to the output bit of the multiplexer. Because there are fifty-three inputs, six select bits are necessary for each of multiplexers 72 (i.e., 2^6>53>2^5). The microstore includes a set of microinstructions. Each set of microinstructions corresponds to a different packing mode. The microinstructions thus control the packing of bits from register 66 to register 68. That is, the microinstructions control the select bits of each of the multiplexers, and also whether a new word should be loaded onto register 66 from bus 70, or whether the word at register 68 is complete and should be loaded onto the PCI bus. At each clock cycle, a different microinstruction controls the select bits of multiplexers 72. In other words, the packer is a state machine that sequences through the microinstructions.

A diagram of a microinstruction is shown in FIG. 3(*b*). The microinstruction of FIG. 3(*b*) has 198 bits. Section 76 of the microinstruction is four bits long, and points to the next microinstruction to be performed. That is, the microinstructions point to one another in a loop fashion. A given number of microinstructions is needed to fully implement any particular packing mode. For example, thirty microinstructions are necessary to implement the packing mode having an input data format of 4:2:2:4__10 and an output data format of 4:2:2:4__10. Thus, the microinstruction executed in one clock cycle points to the microinstruction to be executed during the next clock cycle.

Still referring to FIG. 3(*b*), section 78 of the microinstruction is a next__in__word flag one bit in width, which indicates that the current fifty-bit input has been packed and that the input register should load a new input word from the input bus. Similarly, section 80 of the microinstruction is a next__out__word flag also one bit in width, which indicates that the word in the output register is complete and should be written to the PCI bus. Finally, the remaining 192 of the microinstruction are section 82, which are the thirty-two six-bit multiplexer select bits of the thirty-two multiplexers of the packer.

Figure 4:
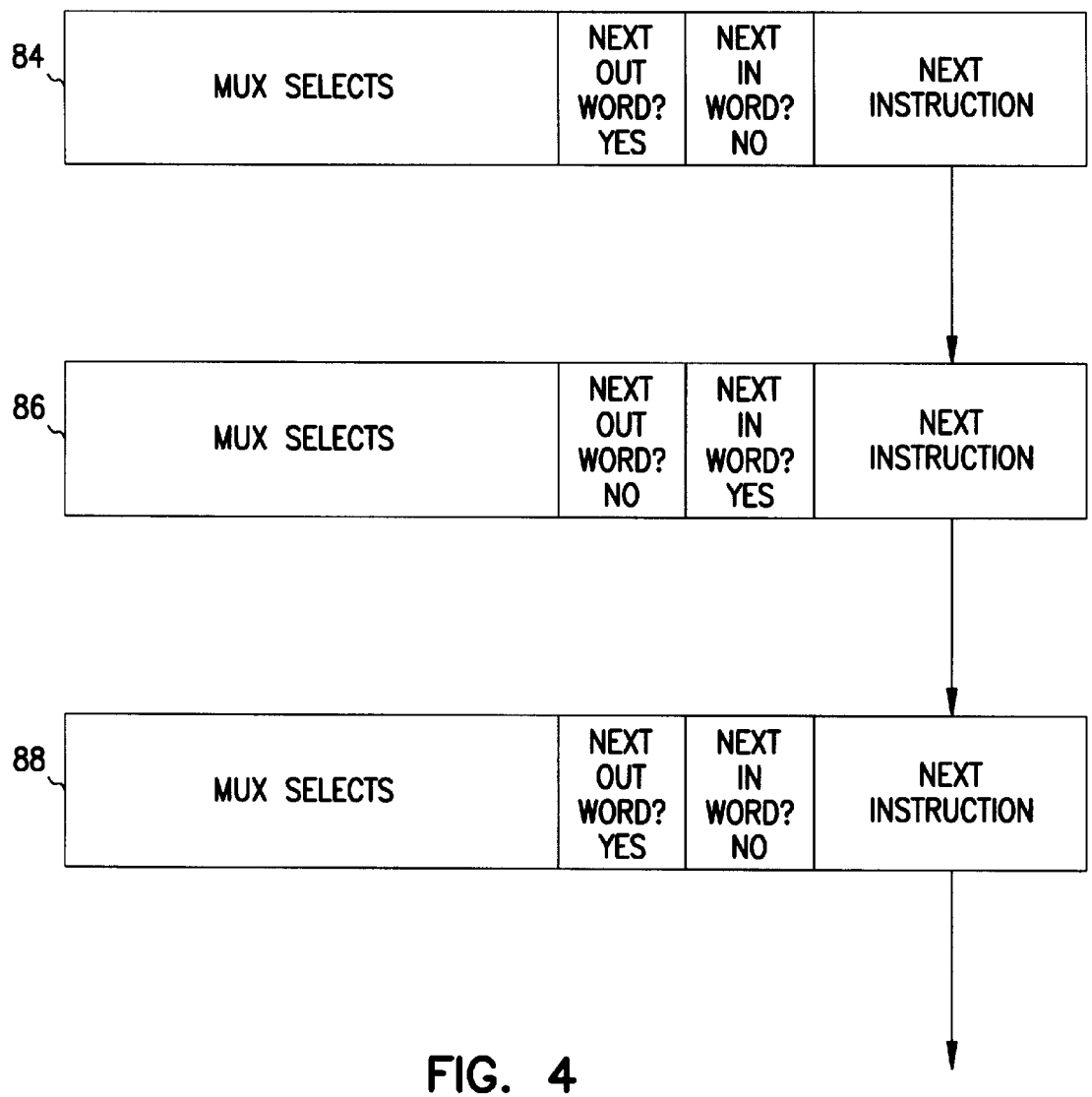
FIG. 4 is a diagram of three microinstructions necessary to implement the functionality of FIG. 2(a), FIG. 2(b) and FIG. 2(c) on the packer of FIG. 3(a)

The operation of the packer of FIG. 3(*a*), having a microstore with a set of microinstructions as shown in FIG. 3(*b*), is understood by reference to FIG. 4. The diagram of FIG. 4 illustrates the three microinstructions necessary for the exemplary finctionality shown in and described in conjunction with FIG. 2(*a*), FIG. 2(*b*) and FIG. 2(*c*). Microinstruction 84 corresponds to the clock cycle of FIG. 2(*a*). That is, the multiplexer select bits of microinstruction 84 are such that the data from bus 26 of FIG. 2(*a*) is packed onto bus 28 of FIG. 2(*a*), as has been described. As also has been described, after the bits are so packed, the data on bus 26 stays for another clock cycle; therefore, the next__in__word flag of microinstruction 84 is zero (i.e., "no"), so that the packer does not load new data onto the input bus. However, as also has been described, bus 28 is complete in FIG. 2(*a*), and the data on bus 28 must be transferred; therefore, the next__out__word flag of microinstruction 84 is 1 (i.e., "yes"), so that the packer transfers the data.

The next__instruction pointer of microinstruction 84 points to microinstruction 86, which is executed in a successive clock cycle, corresponding to the situation shown in FIG. 2(*b*). Thus, the multiplexer select bits of microinstruction 86 correspond to FIG. 2(*b*) such that data is moved from bus 26 to bus 28 as shown. Because the data on bus 26 is completely packed after this operation, the next__in__word flag is 1 (i.e., "yes"), so that the packer loads new data onto the bus. Because bus 28 is not completely full, the next__out__word flag is 0 (i.e., "no"). Finally, the next__instruction pointer of microinstruction 86 points to microinstruction 88, which is executed in a successive clock cycle, corresponding to the situation shown in FIG. 2(*c*).

The multiplexer select bits of microinstruction 88 correspond to FIG. 2(*c*) such that data is moved from bus 26 to bus 28 as shown. Note that because eighteen bits of data on bus 28 were unchanged from FIG. 2(*b*) to FIG. 2(*c*), the multiplexer select bits are such that eighteen of the multiplexers will pass through their feedback bit to their output bit in this clock cycle (the feedback bit equal to the output bit of the multiplexer in the previous clock cycle). The next__in__world flag is set to 0 (i.e., "no") because data on bus 26 is not completely packed onto bus 28. The next__out__word flag is set to 1 (i.e., "yes") because bus 28 is full. Finally, the next__instruction pointer of microinstruction 88 points to the microinstruction to be executed in the next clock cycle.

The constant logic zero and the constant logic one bits of the multiplexers are not used in any of the multiplexer select bits of the microinstructions of FIG. 4, because the input and the output data formats of the packing mode specify an equal number of bits (ten each, because FIG. 4 corresponds to FIGS. 2(*a*), 2(*b*) and 2(*c*), which presumed both an input and an output format of 4:4:4:4__10). Therefore, no logic ones or logic zeros need to be "stuffed" (i.e., inserted) into the output data; all the output data is found in the input data. However, in a packing mode where the input data format is 4:4:4:4__13 and the output data format is 4:4:4:4__16, for example, each of the input data components is thirteen bits in width, while each of the output data component is sixteen bits in width. Therefore, logic zeros or logic ones are inserted either at the most or least significant ends of each of the data components, to make up the three bits that are not found in the input data.

Referring back to FIG. 3(*a*), microstore 74 must be sufficiently larger to store the set of microinstructions for the packing mode supported which has the largest number of microinstruction in its set. The total number of microinstructions needed for a packing mode is the number of unique sets of control words (i.e., mux selects, next__in__word, next__out__word, next__pointer) required for the particular packing mode. At some point within a set of microinstructions, the next__pointer of a microinstruction points to the first microinstruction, thereby making an endless loop. The first microinstruction to this last microinstruction is the set of microinstructions for the packing mode. The microstore must have a width equal to the width of a single microinstruction (i.e., 198 bits), and a length equal to the number of microinstructions for the packing mode having the largest set of microinstructions. As shown in the table of supported packing modes in one embodiment of the invention, this number is 55; therefore, microstore 74 is 198 bits×55 deep, or about 1.3 kilobytes. However, in an exemplary embodiment of the invention, the microstore is only 32 deep, such that not only packing modes are supported (e.g., the mode having input and output data formats of 4:2:2:4__10).

| Packing mode | | total number of |
|---|---|---|
| Input data format | Output data format | microinstructions needed |
| 4:4:4:4_13 | 4:4:4:4_16 | 2 |
| 4:4:4:4_10 | 4:4:4:4_10 | 8 |
| 4:4:4:4_8 | 4:4:4:4_8 | 1 |
| 4:4:4_10 | 4:4:4_10 | 30 |
| 4:2:2:4_10 | 4:2:2:4_10 | 55 |
| 4:2:2:4_8 | 4:2:2:4_8 | 6 |
| 4:2:2_8 | 4:2:2_8 | 2 |
| 4:x:x_8 | 4_8 | 4 |
| 4:x:x_4 | 4_4 | 8 |

Referring back to FIG. 3(a), in another embodiment of the present invention, dither circuit 90 dithers the data from bus 70 before it is placed onto register 66, by adding a dither mask for each of the Y, U, V, and A (alpha) color components of each pixel of data, via adder 91. Dithering the data prevents the phenomenon of moire patterning from occurring when the video data is ultimately displayed. Dithering, as those of ordinary skill within the art understand, makes slight adjustments to data, such that the patterns within the data that most likely will cause moire patterning are disrupted, and moire patterns do not result. The present invention is not limited to any particular manner in which dithering is achieved in conjunction with the packer circuit of FIG. 3(a).

However, as shown in FIG. 3(a), in one embodiment, dither circuit 90 comprises random number generators 92, 94 and 96, which propagate the bits of a random number register 98 with either a logic one or a logic zero. Each random number generator has an equal probability of generating either a logic one or a logic zero; therefore, the DC value of the data to be dithered is maintained, and does not shift. Random number register 98 includes a number of bits equal to the widest of the color components of a pixel of data. Thus, typically random number register 98 is thirteen bits wide. In one embodiment, random number generator 92 propagates bits three, six, nine and twelve of register 98, generator 94 propagates bits two, five, eight and eleven of register 98, and generator 96 propagates bits one, four, seven, ten, and thirteen.

Random number register 98 is coupled to each of four dither masks 100, which have a bit width equal to that of random number register 98. The bit contents of random number register 98 are copied to each mask 100 on a direct bit-to-bit correspondence (i.e., bit one of register 98 is copied to bit one of each mask 100, etc.), or is shifted any number of bits (i.e., bit one of register 98 is copied to bit two of each mask 100, etc.). Further, in one embodiment at least one mask 100 is copied from register 98 on a direct bit-to-bit correspondence, while at least one other mask 100 is copied from register 98 by shifting register 98. Once propagated, the bits of each bit mask are added to their corresponding pixel components of the data loaded from bus 70. Thus, for the Y component mask, each bit thereof is added to the corresponding Y color component of a pixel of the data loaded from bus 70. The use of dither circuit 90, in conjunction with adder 92, is not required for the operation of the packer, however.

Thus, for a given pixel loaded onto bus 70, random number generators 92, 94 and 96 generate random numbers to propagate into the bits of register 98. Each generator, once having generated a random logic one or logic zero, may propagate that same number into each of the bits of register 98 for which it is responsible, or may propagate different numbers into each bit. The dither masks 100, one for each color component of a pixel, are then loaded with the bits of register 98, either by a direct bit-to-bit copying, or by shifting the bits of register 98 any number of bits when copying. As bits of data are then loaded from bus 70 to register 66, the appropriate bits of masks 100 are added to the bits of data, via adder 91.

Figure 5A:
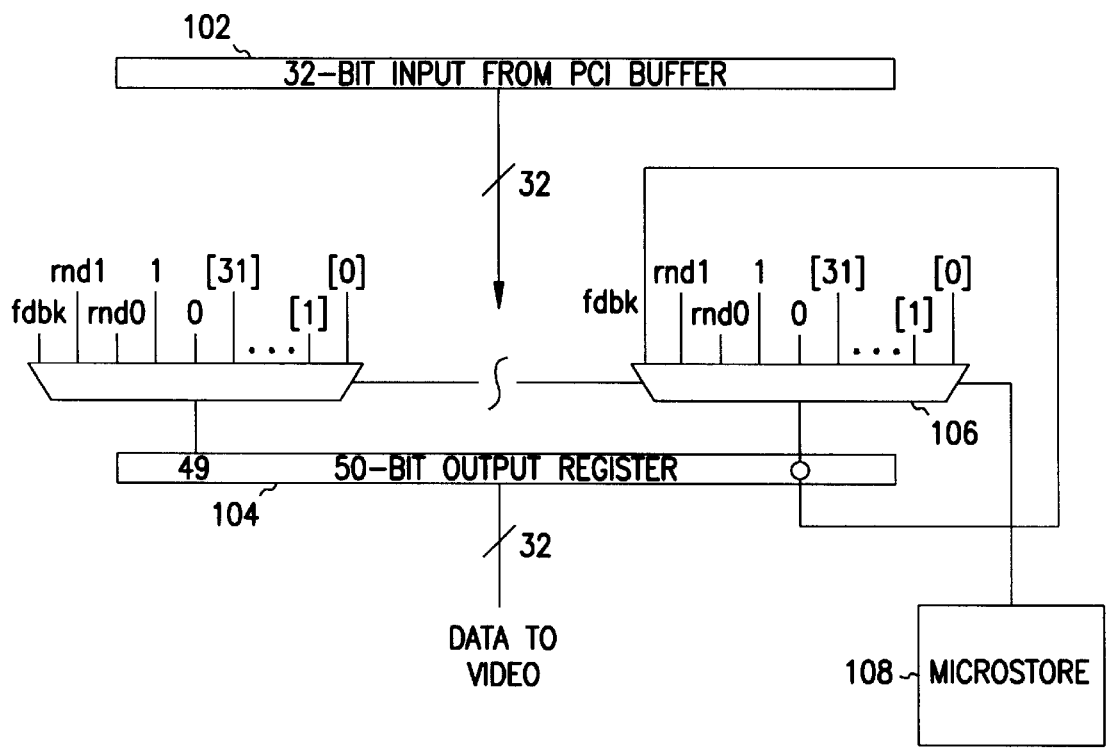
FIG. 5(a) is a block diagram of an exemplary structural embodiment of a programmable unpacker according to the present invention; and, FIG. 5(b) is a diagram of a microinstruction for the microstore of the unpacker of FIG. 5(a).

In the exemplary structural embodiment of the invention, a programmable unpacker is also included. A diagram of a programmable unpacker capable of unpacking bits from a thirty-two bit PCI bus to a fifty-bit bus is shown in FIG. 5(a). Referring now to FIG. 5(a), the unpacker unpacks data from thirty-two bit input register 102 to fifty-bit output register 104. Thirty-two bit input register 102 is coupled to a thirty-two bit PCI bus (not shown), which is comparable and corresponds to bus 22 of FIG. 1. The PCI bus has loaded on it packed digital video data, as packed by the packer, the data including the Y, U, V and A (alpha) color components of a succession of pixels. Fifty-bit output register 104 is coupled to a fifty-bit bus (not shown), such as bus 18 of FIG. 1.

The operation of the unpacker of FIG. 5(a) is identical to that as has been discussed in conjunction with the packer of FIG. 3(a), except that the unpacker moves data from the thirty-two-bit bus to the fifty-bit bus, instead of from the fifty-bit bus to the thirty-two bit bus, as is the case with the packer. The unpacker performs the reverse process of the packer. Conceptually, operation of both the packer and the unpacker is identical, and reference should be made to the discussion of the operation of the packer for understanding regarding the operation of the unpacker.

In a given clock cycle, the unpacker unpacks data from register 102 to register 104. It loads new data from the thirty-two bit bus when the data already on the bus has already been completely unpacked to the fifty-bit bus. Furthermore, the unpacker sends data from fifty-bit register 104 to the fifty-bit bus when register 104 is full. Thus, the unpacker transfers data from thirty-two bit bus to the fifty-bit bus, accounting for the different bit widths of the two buses, and also accounting for any difference in input data format of the data received on the input PCI bus and output data format of the data to be sent over the output fifty-bit bus. Note that the input bus for the packer is the fifty-bit bus, while the input bus for the unpacker is the thirty-two bit bus; likewise, the output bus for the packer is the thirty-two bit bus, while the output bus for the unpacker is the fifty-bit bus.

Like the packer, the unpacker accomplishes this via multiplexers 106. There is one multiplexer for each bit of output register 104 (i.e., for each bit of the fifty-bit bus). Thus, for the exemplary embodiment of FIG. 5(a), there are fifty multiplexers 106. Each of multiplexers 106 has its output bit coupled to a corresponding bit of register 104. The input bits of each of multiplexers 106 is coupled to each of the bits of thirty-two bit register 102. Other input bits of each of multiplexers 106 couple to a constant logic one, a constant logic zero, and a feedback of the registered output of the multiplexer, so that the output of the multiplexer in one clock cycle serves as an input to the multiplexer in a successive clock cycle. Also input bits include random bits zero and one, which are the outputs of two random number generators (e.g., any two of generators 92, 94 and 96 of FIG. 3(a)). Random bits zero and one are used to add noise (dither) the lower two bits when unpacking from a data format having a lesser number of bits per component to a data format having a greater number of bits per component (i.e., eight-bit component width to ten-bit component width). Thus, there are a total of thirty-seven inputs to each of the multiplexers.

Each of multiplexers 106 has its six select bits coupled to microstore 108. Microstore 108 is implemented as a random-access memory within the VIP (i.e., VIP of FIG. 1(a)), and in one embodiment is the identical microstore used for the packer. The microstore includes a set of microinstructions, and like those for the packer, each set of microinstruction corresponds to a different packing mode. The microinstructions control the unpacking of bits from register 102 to register 104, by controlling the select bits of each of the multiplexers, and also whether a new word should be loaded onto register 102 from the PCI bus, or whether the word at register 104 should be loaded onto the fifty-bit bus. At each clock cycle, a different microinstruction controls the select bits of multiplexers 106. Thus, like the packer, the unpacker is a state machine that sequences through the microinstructions.

Figure 5B:
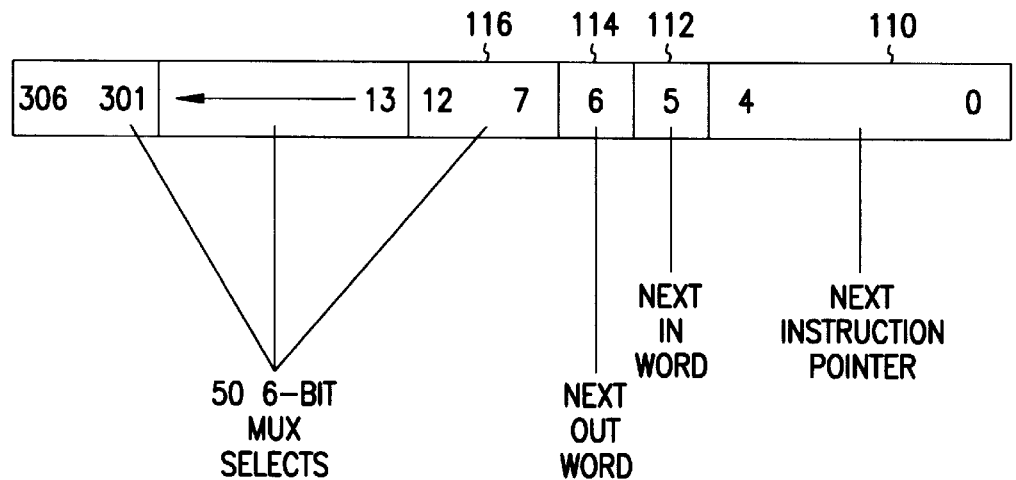

A diagram of a microinstruction for the unpacker is shown in FIG. 5(b). A microinstruction for the unpacker is very similar to a microinstruction for the packer; the difference lies in that the microinstruction of FIG. 5(b) has 306 bits, while the microinstruction for the packer has 198 bits. The microinstruction for the unpacker is longer, because there are more multiplexers for which the microinstruction must provide select bits—the output bus of the unpacker is fifty-bits wide, while the output bus of the packer is thirty-two bits wide. Section 110 of the microinstruction is four bits long, and points to the next microinstruction to be formed. Similar to the microinstruction for the packer, the microinstructions for the unpacker point to one another in a loop fashion. A given number of microinstructions is needed to fully implement any particular packing (unpacking) mode. The microinstruction executed in one clock cycle points to the microinstruction to be executed during the next clock cycle.

Section 112 of the microinstruction is a next_in_word flag one bit in width, which indicates that the current thirty-two bit input has been packed and that the input register should load a new input word from the input bus. Similarly, section 114 of the microinstruction is a next_out_word flag also one bit in width, which indicates that the word in the output register is complete and should be written to the fifty-bit bus. Finally, the remaining 300 bits of the microinstruction are section 116, which are the fifty six-bit multiplexer select bits of the fifty multiplexers of the unpacker.

Referring back to FIG. 5(a), microstore 108 must be sufficiently large to store the set of microinstructions for the packing mode supported which has the largest number of microinstructions in its set. At a point within a set of microinstructions, the next_pointer points to the first microinstruction, thereby making an endless loop. The first microinstruction to this last microinstruction is thus the set of microinstructions for the packing mode. As has been described in conjunction with the packer, the microstore must have a width equal to the width of a single microinstruction (i.e., 306 bits), and a depth equal to the number of microinstructions for the packing mode having the largest set of microinstructions. As shown in the table of supported packing modes in an exemplary embodiment of the invention, this number is thirty; therefore, microstore 108 is 306 bits×30, or about 1.1 kilobytes.

| Packing (unpacking) mode | | total number of |
|---|---|---|
| Input data format | Output data format | microinstructions needed |
| 4:4:4:4_16 | 4:4:4:4_13 | 2 |
| 4:4:4:4_10 | 4:4:4:4_10 | 8 |
| 4:4:4:4_8 | 4:4:4:4_8 | 1 |
| 4:2:2:4_10 | 4:2:2:4_10 | 30 |
| 4:2:2:4_8 | 4:2:2:4_8 | 6 |
| 4:2:2_8 | 4:2:2_8 | 2 |
| 4:x:x_8 | 4_8 | 4 |
| 4:x:x_4 | 4_4 | 8 |

Exemplary Manner for Producing Microstore Coding

As has been described, the microstore coding includes sets of microinstructions for the effectuation of a plurality of different packing modes. The present invention is not limited to any particular approach to the production of this microstore coding. However, in an exemplary manner, the microstore coding is produced via a computer program called packc written in the C programming language.

Packc operates according to the syntax packc [-v|-vv] [-b] [-o output_file_rootname] <source_file>, where -v indicates verbose mode (producing extra information on stdout), -vv indicates extra verbose mode (producing more diagnostic information), -b indicates that binaries files instead of hex dumps should be written (binaries are used in run-time code, while hex dumps are used while simulating), -o output_file_rootname indicates the root name of the output files (extension .po indicating hex packer objects, extension .pb indicating binary packer objects, extension .uo indicating hex unpacker objects, and extension .ub indicating binary unpacker objects), and <source_file> indicates an optional input file normally having an extension .ps (the default source is stdin).

Packc is a command-line driven tool that provides for simple syntax for expressing complex bit combinations, automatic generation of unpacker microcode from packer definitions, support for high-bit replication and zero-filling, and support for constant data values. The input file is free form; carriage returns are treated as any other "white-space" token. Packc supports single-line comments indicated by either# or //. All numbers may be represented in either decimal or hexadecimal form. Decimal numbers are defined as [0–9]+ in 'lex,' which signifies one or more digits in the range 0 to 9. Hexadecimal numbers are one or more digits in the range 0–9, a–f, prepended with '0x.' The letters a–f may be upper or lower case. For non-sequential operations, labels are allowed, and defined as [A-Za-z][A-Za-z0-9]*.

The following table shows the supported fields in an input file.

| | |
|---|---|
| width NUMBER | Default field width (default is eight) |
| replicate | Fill missing least significant bits with replicated high bits |
| zero | Fill missing least significant bits with zero bits |
| dither | Dither when dropping least significant bits (default is no dither) |
| significant NUMBER | Number of significant bits (default is ten) |
| const_r NUMBER | Constant initializer for R (default is 0x200) |
| const_g NUMBER | Constant initializer for G (default is 0x000) |
| const_b NUMBER | Constant initializer for B (default is 0x200) |
| reset | Reset bit position to zero in output |

The default method of filling least significant bits is replicate. On input, dithering is done correctly by adding random values to the least significant bit values with rounding and clamping. On output, the least significant bits are simply driven by random values.

The compiler supports four true video components, plus constant values of zero and one as well as a hold function. The components are expressed in 'lex' as is shown in the following table.

| | |
|---|---|
| "R"\|"r"\|"V"\|"v"\|"CR"\|"Cr"\|"cr" | Red, V or Cr |
| "G"\|"g"\|"Y"\|"y" | Green or Y |
| "B"\|"b"\|"U"\|"u"\|"CB"\|"Cb"\|"cb" | Blue, U or Cb |
| "A"\|"a" | Alpha |
| "Z"\|"z" | Constant zero |
| "O"\|"o" | Constant one |
| "H"\|"h" | Hold |

A set of bits from a component is specified in one of three ways. First, comp[number1:number2] indicates that number1 bits from component comp beginning number2 bits up from the least significant bit are extracted. Second, comp [number] indicates that number bits from component comp are extracted using the significant directive to determine the most significant bit. Third, comp indicates that the default_width bits from component comp are extracted using the significant directive to determine the most significant bit. Source pixels are consumed using the ";" command. Output words are produced whenever thirty-two bits have been collected. Further, packc attempts to determine when to sign extend. This logic can become confused when very large field widths are used. The 'Z' and 'O' fields should not be used with more than nine bits at a time. The comp [number1:number2] format should not be used with number2 non-zero for 'Z' and 'O.'

As an example of how to use packc, the following source file shows how to produce properly co-sited 4:2:2_10 samples.

width 10
Cr Y Cb; Y;
Cr Y Cb; Y;
Cr Y Cb; Y;
Cr Y Cb; Y;

There are five components to the packc source files (to be compiled by a C compiler), which listed in alphabetical order are lexer.l, main.c, makefile, packc.h, and packc.y. Each of these files is listed in turn.

| lexer.l program listing |
|---|
| %{ |
| #include "packc.h" |
| #include "y.tab.h" |
| %} |
| DIGS [0–9]+ |
| HEXDIGS [0–9A-Fa-f]+ |
| ID [A–Za–z][A–Za–z0–9_]* |
| %% |
| "#".*\|"//".*    {;}    /* Single-line comments */ |
| [\t\,]    {;}    /* Skip blanks and tabs */ |
| "\n"    {lineno++;} |
| {DIGS}    {sscanf(yytext,"%d",&yylval.intval); return(NUMBER);} |
| "0x"{HEXDIGS}    {sscanf(yytext,"0x%x",&yylval.intval); returnNUMBER);} |
| "width"    {return(DEFWID);} |
| "replicate"    {return(REPHIGH);} |
| "zero"    {return(ZEROFILL);} |
| "dither"    {return(DITHER);} |

| -continued |
|---|
| lexer.l program listing |
| "wrap"    {return(WRAP);} |
| "reset"    {return(RESET);} |
| "const_r"    {return(CONST_R);} |
| "const_g"    {return(CONST_G);} |
| "const_b"    {return(CONST_B);} |
| "const_a"    {return(CONST_A);} |
| "significant"    {return(MSB);} |
| "R"\|"r"\|"V"\|"v"\|"CR"\|"Cr"\|"cr"    {return(RED);} |
| "G"\|"g"\|"Y"\|"y"    {return(GREEN);} |
| "B"\|"b"\|"U"\|"u"\|"CB"\|"Cb"\|"cb"    return(BLUE);} |
|     $$.position = high_bit – $$.width; |
|     $$.filler = 0; |
|   } |
| \| comp '[' NUMBER ']'    {$$.compnum = $1; |
|     $$.width = $3; |
|     $$.position = high_bit – $$.width; |
|     $$.filler = 0; |
|   } |
| \| comp '[' NUMBER ':' NUMBER ']'    {$$.compnum = $1; |
|     $$.width = $3; |
|     $$.position = $5; |
|     $$.filler = 0; |
|   } |
| ; |
| comp:    RED    {$$= RED_COMP;} |
|   \| GREEN    {$$ = GREEN_COMP;} |
|   \| BLUE    {$$ = BLUE_COMP;} |
|   \| ALPHA    {$$ = ALPHA_COMP;} |
|   \| ZERO    {$$ = ZERO_COMP;} |
|   \| ONE    {$$ = ONE_COMP;} |
|   \| HOLD    {$$ = HOLD_COMP;} |
| ; |
| %% |

Conclusion

A programmable unpacker and packer has been described. Those of ordinary skill within the art will recognize that many changes and modifications can be made to the above-described invention without departing from the scope of the claims. For example, the invention has been shown to apply in the context of a video pipe for use in a video application. However, the invention is not so limited, and may also be used in the context of any other application in which the transfer of data between different-sized buses is required. For further example, the invention has been shown to apply in the context of an output bus which is a PCI bus having thirty-two bits. Although this is an exemplary embodiment, the invention as claimed is not so limited.

I claim:

1. A system comprising:

a first bus having a plurality of bits;

a second bus having a plurality of bits less than the first bus; and, a programmable packer capable of packing the bits of the first bus to the bits of the second bus according to one of a plurality of different packing modes, wherein the programmable packer comprises:

a plurality of multiplexers, each multiplexer corresponding to a bit of the second bus; and, a microstore having a set of at least one microinstruction corresponding to the one of the plurality of different packing modes;

wherein each microinstruction includes select bits for each of the multiplexers.

2. A system comprising:

a first bus having a plurality of bits;

a second bus having a plurality of bits less than the first bus;

a programmable packer capable of packing the bits of the first bus to the bits of the second bus according to one of a plurality of different packing modes; and, a programmable unpacker capable of unpacking the bits of the second bus to the first bus according to the one of the plurality of different packing modes, wherein the programmable unpacker comprises:
  a plurality of multiplexers, each multiplexer corresponding to a bit of the second bus; and,
  a microstore having a set of at least one microinstruction corresponding to the one of the plurality of different packing modes,
  wherein each microinstruction includes select bits for each of the multiplexers.

3. A packer circuit for packing a plurality of bits of a first bus to a lesser plurality of bits of a second bus, comprising:

a plurality of multiplexers, each multiplexer having an output bit coupled to a corresponding bit of the second bus and a plurality of input bits coupled and corresponding to at least the bits of the first bus; and, a microstore having a set of at least one microinstruction corresponding to one of a plurality of different packing modes, wherein each microinstruction includes select bits for each of the multiplexers.

4. An unpacker circuit for unpacking a plurality of bits of a first bus from a lesser plurality of bits of a second bus, comprising:

a plurality of multiplexers, each multiplexer having an output bit coupled to a corresponding bit of the first bus and a plurality of input bits coupled and corresponding to at least the bits of the second bus; and, a microstore having a set of at least one microinstruction corresponding to one of a plurality of different packing modes, wherein each microinstruction includes select bits for each of the multiplexers.

* * * * *

UNITED STATES PATENT AND TRADEMARK OFFICE
CERTIFICATE OF CORRECTION

PATENT NO.: 6,065,084

DATED: May 16, 2000

INVENTOR(S):Tony Chatzigianis et al.

It is certified that error appears in the above-identified patent and that said Letters Patent is hereby corrected as shown below:

In column 16, between lines 13 and 14, insert

Signed and Sealed this

Thirteenth Day of March, 2001

Attest:

NICHOLAS P. GODICI

Attesting Officer

Acting Director of the United States Patent and Trademark Office

```
"A"|"a"                    { return(ALPHA); }
"Z"|"z"                    { return(ZERO); }
"O"|"o"                    { return(ONE); }
"H"|"h"                    { return(HOLD); }
{ID}              { yylval.strval = strsave(yytext);
                    return(IDENTIFIER); }
.                          { return(yytext[0]); }
``` main.c program listing

```
/*
 * File: main.c
 * Main source file for packer ucode compiler.
 *
 * Copyright 1996, Silicon Graphics, Inc.
 * All Rights Reserved.
 *
 * This is UNPUBLISHED PROPRIETARY SOURCE CODE of Silicon Graphics, Inc.;
 * the contents of this file may not be disclosed to third parties, copied or
 * duplicated in any form, in whole or in part, without the prior written
 * permission of Silicon Graphics, Inc.
 *
 * RESTRICTED RIGHTS LEGEND:
 * Use, duplication or disclosure by the Government is subject to restrictions
 * as set forth in subdivision (c)(1)(ii) of the Rights in Technical Data
 * and Computer Software clause at DFARS 252.227-7013, and/or in similar or
 * successor clauses in the FAR, DOD or NASA FAR Supplement. Unpublished -
 * rights reserved under the Copyright Laws of the United States.
```

```c
*/
#define     EXTERN
#include "packc.h"
#include <divo_ucode.h>
#include <stdlib.h>
#include <string.h>
include <sys/param.h> typedef struct symbol {
    const char      *name;
    int             instruction;
    struct symbol   *next;
} Symbol;

/*
 * External variables
 */
extern char     *optarg;
extern int      optind;
extern FILE     *yyin;

/*
 * Local static variables.
 */
static  int                 bit_pos = 0;
static  int                 pix_num = 0;
static  int                 result_num = 0;
static  int                 word_ready = 0;
```

```
static   int                  inst_num = 0;
static   int                  wrap_point = -1;
static   Symbol               *symbols = NULL;
static   packer_instruction   packer_output[MAX_INST_COUNT+1];
static   unpacker_instruction unpacker_output[MAX_INST_COUNT+1];

static component_stats comp_stats[NUM_COMP_TYPES] = {
    RED_BASE,      RED_WIDTH,
    GREEN_BASE,    GREEN_WIDTH,
    BLUE_BASE,     BLUE_WIDTH,
    ALPHA_BASE,    ALPHA_WIDTH,
    ZERO_BASE,     ZERO_WIDTH,
    ONE_BASE,      ONE_WIDTH,
    HOLD_BASE,     HOLD_WIDTH,
};

static int comp_const_vals[NUM_COMP_TYPES] = { 0x200, 0, 0x200, 0, 0, 0, 0 };

static char comp_names[NUM_COMP_TYPES] = { 'R', 'G', 'B', 'A', 'Z', 'O', 'H' };

static   void                 do_init(int argc, char **argv);
static   int                  do_cleanup();

/*
 * YACC error handlers.
 */
void error_exit(s1,s2)
    char   *s1,
```

```c
        *s2;
{
   fprintf(stderr,"%s: %s %s\n",progname,s1,s2);
   exit(1);
} void error_exit2(s1,s2)
   char   *s1,
        *s2;
{
   fprintf(stderr,"%s: (%s) %s near line %d of %s\n",progname,s1,s2,lineno,source_file);
   exit(1);
} int
yyerror(s)
   char   *s;
{
   fprintf(stderr,"%s: %s near line %d of %s\n",progname,s,lineno,source_file);
   return(0);
}

/*
 * Main program
 */
int main(int argc,char **argv) { do_init(argc,argv);
```

```c
        yyparse();
        do_cleanup();
}

/*
 * Initialize
 */
static void do_init(int argc, char **argv) {
    int                    c, I, j;
    packer_instruction     *p_inst;
    unpacker_instruction   *up_inst;

/*
     * Initialize static data
     */
    progname = argv[0];
    lineno = 1;
    default_width = DEFAULT_WIDTH;
    fill_mode = FILL_MODE_REPLICATE;
    high_bit = DEFAULT_HIGH_BIT;
    verbose = FALSE;
    binary_output = FALSE;
    source_file = "<stdin>";
    output_file = "packer.out";

/*
     * Initialize all output bits to "hold" and "filler" state
     * Also clear produce and consume.  Set next to zero.
```

```c
 */
for ( I = 0; I < MAX_INST_COUNT; I++ ) {
   p_inst = &packer_output[i];
   p_inst->next = 0;
   p_inst->consume = 0;
   p_inst->produce = 0;
   for ( j = 0; j < BUSWIDTH; j++ ) {
      p_inst->mux_sel[j] = HOLD_BASE | FILLER_FLAG;
   }
   up_inst = &unpacker_output[i];
   up_inst->next = 0;
   up_inst->consume = 0;
   up_inst->produce = 0;
   for ( j = 0; j < DATA_WIDTH; j++ ) {
      up_inst->mux_sel[j] = UNPACKER_HOLD | FILLER_FLAG;
   }
}

/* Process command-line args */
while ((c = getopt(argc,argv, "vbo:")) != EOF) {
   switch(c) {
      case 'b':
         binary_output = TRUE;
         break;
      case 'o':
         output_file = optarg;
         break;
      case 'v':
```

```c
            verbose++;
            break;
        }
    }
    if ( optind < argc ) {
        source_file = argv[optind];
        yyin = fopen(source_file,"r");
        if ( yyin == NULL ) {
            fprintf(stderr,"%s: unable to open file %s for input.\n",
                progname,source_file);
            exit(1);
        }
    }
} static int output_bits(FILE *outfile, int val, int width,int verbosity) {
    static unsigned int bit_masks[32] = {
        0x00000000, 0x00000001, 0x00000003, 0x00000007,
        0x0000000f, 0x0000001f, 0x0000003f, 0x0000007f,
        0x000000ff, 0x000001ff, 0x000003ff, 0x000007ff,
        0x00000fff, 0x00001fff, 0x00003fff, 0x00007fff,
        0x0000ffff, 0x0001ffff, 0x0003ffff, 0x0007ffff,
        0x000fffff, 0x001fffff, 0x003fffff, 0x007fffff,
        0x00ffffff, 0x01ffffff, 0x03ffffff, 0x07ffffff,
        0x0fffffff, 0x1fffffff, 0x3fffffff, 0x7fffffff
    };
    static unsigned int   bitpos = 0;
    static unsigned int   saved_bits = 0;
```

```c
    int         chunk, remainder;

if ( width > 32 )
   return(-1);

if ( verbosity > 1 ) printf("%02X",val,width);
if ( (bitpos + width) >= 32 ) { /* Will produce output */
   chunk = 32 - bitpos;
   remainder = width - chunk;
   saved_bits <<= chunk;
   saved_bits |= (val >> remainder);
   if (binary_output)
      fwrite(&saved_bits,sizeof(saved_bits),1,outfile);
   else
      fprintf(outfile,"%08X\n",saved_bits);
   bitpos = 0;
   saved_bits = 0;
   val &= bit_masks[remainder];
   width = remainder;
}

/* Handle the fraction */
saved_bits <<= width;
saved_bits |= val;
bitpos += width;
return(0);
}
```

```c
/*
 * Output a variable number of zeroes
 */
static void output_zeroes(FILE       *outfile, int count, int verbose ) {
   int   chunk;

while (count > 0) {
      chunk = (count > 8) ? 8: count;
      output_bits(outfile,0,chunk,verbose);
      count -= chunk;
   }
}

/*
 * Compute sampling and bit-precision statistics for a color component
 */
static void compute_stats(int comp_num, unsigned int *samp_rate,unsigned int *samp_bits) {
   int   comp_base;
   int comp_width;
   int mux_value;
   int   bits_sampled_this_pixel, bits_sampled_total;
   int   pixels_sampled;
   int   i,j;

comp_base = comp_stats[comp_num].base;
   comp_width = comp_stats[comp_num].width;
```

```
      pixels_sampled = 0;
      bits_sampled_total = 0;
      bits_sampled_this_pixel = 0;

for ( I = 0; I < inst_num; I++ ) {
         for ( j = 0; j < BUSWIDTH; j++ ) {
            mux_value = packer_output[i].mux_sel[j];
            if ( (mux_value >= comp_base) && (mux_value < (comp_base+comp_width)) ) {
               bits_sampled_this_pixel++;
            }
         }
         if (packer_output[i].consume) { /* Done with this input pixel */
            if ( bits_sampled_this_pixel > 0 ) {
               pixels_sampled++;
               bits_sampled_total += bits_sampled_this_pixel;
            }
            bits_sampled_this_pixel = 0;
         }
      }
      *samp_rate = 4 * pixels_sampled / pix_num;
      *samp_bits = (pixels_sampled > 0) ? (bits_sampled_total / pixels_sampled) : 0;
      if ( verbose ) {
         printf("%c component sampled %d/4 samples, using an average of %d bits.\n",
            comp_names[comp_num], *samp_rate,*samp_bits);
      }
   }
}

/*
```

```c
 * Fill in the object header information.  Component statistics must
 * be computed.
 */
static void init_header(DIVOVPackerObjHeader *header, int uobj) {
   bzero(header,sizeof(DIVOVPackerObjHeader));
   header->magic1 = DIVOMAGIC;
   header->magic2 = (uobj) ? DIVOVIDUBINMAGIC:DIVOVIDPBINMAGIC;
   header->version = DIVOVIDPBINVERSION;
   header->repeat_period = pix_num;
   header->words_per_period = result_num;

/* Compute sampling and bit precision statistics for each component */
   compute_stats(RED_COMP,&header->r_samp_rate,&header->r_samp_bits);
   compute_stats(GREEN_COMP,&header->g_samp_rate,&header->g_samp_bits);
   compute_stats(BLUE_COMP,&header->b_samp_rate,&header->b_samp_bits);
   compute_stats(ALPHA_COMP,&header->a_samp_rate,&header->a_samp_bits);
}

/*
 * Finish and output code.
 */
static int do_cleanup() {
    int                   I, j;
    packer_instruction    *p_inst;
    unpacker_instruction  *up_inst;
    FILE                  *outfile;
    char                  fname[MAXPATHLEN];
    DIVOVPackerObjHeader  header;
```

```c
if ( verbose ) {
    printf("In %d cycles: consumed %d pixels, produced %d words with %d bits left.\n",
      inst_num, pix_num, result_num, bit_pos);
} if (inst_num > 0) {
    strcpy(fname,output_file);
    strcat(fname,(binary_output) ? ".pb":".po");
    if ( (outfile = fopen(fname,"w")) == NULL ) {
        error_exit("unable to open output file: ",fname);
    }
    if ( verbose > 1 ) printf("Packer Ucode\n");
    /* Wrap to the beginning if not specified in the source */
    if (packer_output[inst_num-1].next == inst_num)
        packer_output[inst_num-1].next = 0;
    init_header(&header,FALSE);
    /* If binary, write out the header */
    if (binary_output) {
        fwrite(&header,sizeof(header),1,outfile);
    }
    for ( I = 0; I < inst_num; I++ ) {
        p_inst = &packer_output[i];

output_zeroes(outfile,TOTAL_UBITS-(BUSWIDTH*MUX_UBITS+1+1+NEXT_UBITS),verbose);
        for ( j = BUSWIDTH - 1; j >= 0; j-- )
            output_bits(outfile,p_inst->mux_sel[j] &
```

```c
            ~FILLER_FLAG,MUX_UBITS,verbose);
        output_bits(outfile,p_inst->produce,1,verbose);
        output_bits(outfile,p_inst->consume,1,verbose);
        output_bits(outfile,p_inst->next,NEXT_UBITS,verbose);
        if ( verbose > 1 ) printf("\n");
    }
    /*
     * Pad the output file with zeroes
     */
    for ( ; I < MAX_INST_COUNT; I++ ) {
        for ( j = TOTAL_UBITS; j > 0; j -= 32 )
        output_bits(outfile,0,32,0);
    }
    fclose(outfile);

strcpy(fname,output_file);
    strcat(fname,(binary_output) ? ".ub":".uo");
    if ( (outfile = fopen(fname,"w")) == NULL ) {
        error_exit("unable to open output file: ",fname);
    }
    if ( verbose > 1 ) printf("Unpacker Ucode\n");
    /* Wrap to the beginning if not specified in the source */
    if (unpacker_output[inst_num-1].next == inst_num)
        unpacker_output[inst_num-1].next = 0;
    init_header(&header,TRUE);
    /* If binary, write out the header */
    if (binary_output) {
        fwrite(&header,sizeof(header),1,outfile);
```

```c
    }
    for ( I = 0; I < inst_num; I++ ) {
        up_inst = &unpacker_output[i];

output_zeroes(outfile,TOTAL_UBITS-(DATA_WIDTH*MUX_UBITS+1+1+NEXT_U
BITS),verbose);
        for ( j = DATA_WIDTH - 1; j >= 0; j-- )
        output_bits(outfile,up_inst->mux_sel[j] &
~FILLER_FLAG,MUX_UBITS,verbose);
        output_bits(outfile,up_inst->produce,1,verbose);
        output_bits(outfile,up_inst->consume,1,verbose);
        output_bits(outfile,up_inst->next,NEXT_UBITS,verbose);
        if ( verbose > 1 ) printf("\n");
    }
    /*
     * Pad the output file with zeroes
     */
    for ( ; I < MAX_INST_COUNT; I++ ) {
        for ( j = TOTAL_UBITS; j > 0; j -= 32 )
        output_bits(outfile,0,32,0);
    }
    fclose(outfile);
    }
    return(0);
}

/*
```

```
 * Fix-up a component in the unpacker instruction stream.
 * This is done by finding the MSB and LSB written to within the
 * range start_inst .. end_inst inclusively.
 * The MSB is sign-extended if needed.  The LSBs are replicated if needed.
 * Fill in the constant value if the component is not driven at all.
 */
static void fixup_component(int comp_num, int end_inst) {
   int   comp_base;
   int comp_width;
   int min_bit;
   int max_bit;
   int start_inst;
   int   mux_value;
   int   i,j;
   mux_record        bit_selects[MAX_WIDTH];

comp_base = comp_stats[comp_num].base;
   comp_width = comp_stats[comp_num].width;
   min_bit = comp_width + 1;
   max_bit = -1;
   for ( I = 0; I < MAX_WIDTH; I++ ) {
      bit_selects[i].inst_num = -1;
      bit_selects[i].mux_sel = 0xff;
   }

/*
    * Find the MS and LS bits that were actually driven.
    */
```

```
      start_inst = end_inst;
      for ( I = end_inst; I >= 0; I-- ) {
        for ( j = 0; j < comp_width; j++ ) {
          mux_value = unpacker_output[i].mux_sel[j+comp_base];
          if ( !(mux_value & FILLER_FLAG) && (mux_value != UNPACKER_HOLD) )
{
          /* Record the last time the bit was set */
          if ( bit_selects[j].inst_num < 0 ) {
            bit_selects[j].inst_num = I;
            bit_selects[j].mux_sel = unpacker_output[i].mux_sel[j+comp_base];
            if ( j < min_bit ) min_bit = j;
            if ( j > max_bit ) max_bit = j;
            if ( I < start_inst ) start_inst = I;
          }
        }
      }
    }

/* If the component was not driven at all initialize to the constant value */
    if ( min_bit > max_bit ) {
      int fill_value = comp_const_vals[comp_num];
      for ( j = 0; j < comp_width; j++ ) {
        unpacker_output[0].mux_sel[j+comp_base] = (fill_value & 1) ?
          UNPACKER_ONE | FILLER_FLAG : UNPACKER_ZERO | FILLER_FLAG;
        fill_value >>= 1;
      }
      return;
    }
```

```c
/*
 * Deal with any un-driven LSB's
 */
if (min_bit > 0) {              /* We have un-driven LSB's */
   switch (fill_mode) {
     case FILL_MODE_ZERO:
       {
       for ( I = 0; I < end_inst; I++ ) {
          for ( j = min_bit - 1; j >= 0; j-- ) {
             unpacker_output[i].mux_sel[j+comp_base] =
                UNPACKER_ZERO | FILLER_FLAG;
          }
       }
       }
       break;
     case FILL_MODE_REPLICATE:
       {
       if ( (UNSIGNED_PREC - max_bit) > 1 ) {
          fprintf(stderr,"%s: Unable to replicate high bits for unpacker.\n",progname);
          fprintf(stderr,"Highest bit of component %c driven was %d.\n",comp_names[comp_num],max_bit);
          exit(1);
       }
       /* Replicate high bits down. */
       for ( j = min_bit - 1; j >= 0; j-- ) { unpacker_output[bit_selects[UNSIGNED_PREC-min_bit+j].inst_num].mux_sel[j+comp_base] =
```

```
                bit_selects[UNSIGNED_PREC-min_bit+j].mux_sel | FILLER_FLAG;
            /* Copy house-keeping info */
            bit_selects[j] = bit_selects[UNSIGNED_PREC-min_bit+j];
          }
        }
        break;
      case FILL_MODE_DITHER:
        {
        for ( I = 0; I < end_inst; I++ ) {
            for ( j = min_bit - 1; j >= 0; j-- ) {
                unpacker_output[i].mux_sel[j+comp_base] =
                    (UNPACKER_DITHER_BASE + (j %
UNPACKER_DITHER_WIDTH))| FILLER_FLAG;
            }
          }
        }
        break;
      default:
        error_exit2("Bad fill-mode","can't proceed");
        break;
    }
  }
  /* Sign-extend or Zero-extend if needed. */
  if ( max_bit < (comp_width-1) ) {
    if ( max_bit >= UNSIGNED_PREC ) { /* Signed value, replicate sign bit */
      for ( j = max_bit+1; j < comp_width; j++ ) {
        unpacker_output[bit_selects[max_bit].inst_num].mux_sel[j+comp_base] =
            bit_selects[max_bit].mux_sel | FILLER_FLAG;
```

```c
      }
    }
    else {      /* Unsigned value, just zero extend */
      for ( j = max_bit+1; j < comp_width; j++ ) {
        unpacker_output[bit_selects[max_bit].inst_num].mux_sel[j+comp_base] =
          UNPACKER_ZERO | FILLER_FLAG;
      }
    }
  }
}

/*
 *
 */
void set_const_val(int compnum, int val) {
  if ( (compnum < 0) || (compnum >= NUM_COMP_TYPES) ) {
    error_exit2("Illegal component number","can't set constant value");
  }
  comp_const_vals[compnum] = val;
}

/*
 * Save a copy of a string
 */
char *strsave(const char *s) {
  char *result;
```

```c
    result = malloc(strlen(s)+1);
    strcpy(result,s);
    return(result);
} static Symbol *lookup_symbol(const char *name) {
    Symbol    *s = symbols;

while ( s && strcmp(s->name,name) ) s = s->next;
    return(s);
}

/*
 * Define a label.  Store Uinst with name.
 * Takes ownership of label storage
 */
void define_label(const char *name) {
    Symbol    *s;

if (lookup_symbol(name))
       error_exit2(name,"Label already defined");
    s = (Symbol *)malloc(sizeof(Symbol));
    s->name = name;
    s->instruction = inst_num;
    s->next = symbols;
    symbols = s;
}
```

```c
/*
 * Wrap back to the specified label
 * Must free label_name storage
 */
void do_wrap(const char *name) {
    Symbol    *s;

if (!(s = lookup_symbol(name)))
        error_exit2(name,"No such label");
    wrap_point = s->instruction;
    free((char *)name);
}

/*
 * Reset the bit position
 */
void do_reset() {
    bit_pos = 0;
}

/*
 * Advance video stream by one pixel
 */
void do_pixclock() {
    int                     comp_num;
    unpacker_instruction    *cur, *next;

packer_output[inst_num].consume = 1;
```

```c
      unpacker_output[inst_num].produce = 1;
      if ( wrap_point >= 0 ) {
         packer_output[inst_num].next = wrap_point;
         unpacker_output[inst_num].next = wrap_point;
         wrap_point = -1;
      }
      else {
         packer_output[inst_num].next = inst_num+1;
         unpacker_output[inst_num].next = inst_num+1;
      }
      if ( word_ready ) {
         if (verbose) printf("!\n");
         packer_output[inst_num].produce = 1;
         unpacker_output[inst_num].consume = 1;
         result_num++;
         word_ready = 0;
      }

/* "Intelligently" drive unspecified unpacker muxes. */
      for ( comp_num = RED_COMP; comp_num <= ALPHA_COMP; comp_num++ ) {
         fixup_component(comp_num,inst_num);
      }
      inst_num++;
      pix_num++;
   }

/*
   Generate ucode for one chunk of bits
```

```c
*/
static void generate_code(bitset chunk) {
    int         I;
    int         comp_base, comp_width, comp_max;
    int         video_bit;
    int         bus_bit;

if (verbose) printf("C%c%02d[%d:%d]",comp_names[chunk.compnum],
                pix_num,chunk.width,chunk.position);
    comp_base = comp_stats[chunk.compnum].base;
    comp_width = comp_stats[chunk.compnum].width;
    comp_max = comp_base + comp_width - 1;
    for ( I = chunk.width - 1; I >= 0; I-- ) {
        video_bit = comp_base + chunk.position + I;
        if ( video_bit > comp_max ) video_bit = comp_max;
        bus_bit = (BUSWIDTH-bit_pos-chunk.width)+I;
        packer_output[inst_num].mux_sel[bus_bit] = video_bit;
/*
  This generates unpacker code for bits that were purposefully
  assigned in the packer.  The rest of the bits are handled
  in do_pixclock()
*/
        if ( !(chunk.filler) && (video_bit < ZERO_BASE) ) {
            unpacker_output[inst_num].mux_sel[video_bit] = bus_bit;
        }
    }
}
```

```c
/*
 * Output one component.
 */
static void one_component(bitset comp, int max_wid) {
    bitset      temp;
    int         space;

/* Nothing to do for null fields */
    if ( comp.width <= 0 ) return;
/*
   Handle word boundary crossing.
*/
    space = BUSWIDTH - bit_pos;
    if ( space < comp.width ) {
        temp.compnum = comp.compnum;
        temp.width = space;
        temp.position = comp.position + (comp.width - space);
        temp.filler = 0;
        one_component(temp,max_wid);
        comp.width -= space;
    }

/*
   We are about to generate code. If a word is pending, go ahead and flush it.
*/
    if ( word_ready ) {
        if (verbose) printf("!\n");
        packer_output[inst_num].produce = 1;
```

```
      unpacker_output[inst_num].consume = 1;
      if ( wrap_point >= 0 ) {
         packer_output[inst_num].next = wrap_point;
         unpacker_output[inst_num].next = wrap_point;
         wrap_point = -1;
      }
      else {
         packer_output[inst_num].next = inst_num+1;
         unpacker_output[inst_num].next = inst_num+1;
      }
      inst_num++;
      result_num++;
      word_ready = 0;
   }

/*
   Abort if too many micro-instructions are needed.
*/
   if ( inst_num >= MAX_INST_COUNT ) {
      error_exit("instruction count too large.\n"," ");
   }

/*
   At this point, we can directly output code for this chunk.
*/
   generate_code(comp);
   bit_pos += comp.width;
```

```
    /*
      If a word is ready, mark it and reset bit_pos.
    */
      if ( bit_pos == BUSWIDTH ) {
        bit_pos = 0;
        word_ready = 1;
      }
  }

/*
    Generate the code for one source component.
  */
  void do_component(bitset comp) {
      bitset    temp;
      int       max_width;
      int       sign_bits;

#ifdef NOT
      printf("do_comp %c%02d[%d:%d],%d\n",comp_names[comp.compnum],
          pix_num,comp.width,comp.position,comp.filler);
endif max_width = comp_stats[comp.compnum].width;
      if ( max_width > high_bit ) max_width = high_bit;

sign_bits = high_bit - max_width;
      while ((sign_bits > 0) && (comp.width > 0)) { /* Replicate the sign bit if needed */
        temp.compnum = comp.compnum;
```

```
      temp.width = 1;
      temp.position = max_width - 1;
      temp.filler = 1;
      one_component(temp,max_width);
      sign_bits--;
      comp.width--;
   }

/*
   Handle a field larger than the component width.
   This will not replicate the same bits more than once.
*/
   if ( comp.width > max_width ) {   /* Split */
      temp = comp;
      temp.width = max_width;
      temp.position = comp.position + (comp.width - max_width);
      one_component(temp,max_width);
      if ( comp.width > UNSIGNED_PREC ) {
         /* For signed numbers, don't replicate the sign bit */
         comp.width -= max_width;
         comp.position = max_width - comp.width - 1;
      }
      else {
         comp.width -= max_width;
         comp.position = max_width - comp.width;
      }
      comp.filler = 1;
      if (fill_mode == FILL_MODE_ZERO) {
```

```
            temp.compnum = ZERO_COMP;
            temp.position = 0;
            temp.width = 1;
            temp.filler = 1;
            while ( comp.width -- )
              one_component(temp,max_width);
        }
    }
    /* Now the standard-case or remainder */
    one_component(comp,max_width);
}
``` makefile program listing

```
#!smake

# $Revision: 1.6 $

DEPTH = ../..
include $(DEPTH)/divodefs

TARGETS = packc
OBJECTS = main.o packc.o lexer.o
CFILES = main.c
HFILES = packc.h
YFILES = packc.y
LFILES = lexer.l
LCINCS = -I. -I../../kern/sys
```

```
YFLAGS = -d
LDIRT = y.tab.h

INSTALLED=packc

TARGETS = $(INSTALLED)

default all: $(TARGETS)

include $(COMMONRULES)

packc: $(OBJECTS) Makefile
    $(CCF) -o packc $(OBJECTS) -ll install:default
    $(INSTALL) -F $(DIVO_BIN_DIR) $(INSTALLED)
``` packc.h program listing

```
/*
 * File: packc.h
 * Header definitions for packer ucode compiler.
 *
 * Copyright 1996, Silicon Graphics, Inc.
 * All Rights Reserved.
 *
 * This is UNPUBLISHED PROPRIETARY SOURCE CODE of Silicon Graphics, Inc.;
 * the contents of this file may not be disclosed to third parties, copied or
 * duplicated in any form, in whole or in part, without the prior written
```

```
 * permission of Silicon Graphics, Inc.
 *
 * RESTRICTED RIGHTS LEGEND:
 * Use, duplication or disclosure by the Government is subject to restrictions
 * as set forth in subdivision (c)(1)(ii) of the Rights in Technical Data
 * and Computer Software clause at DFARS 252.227-7013, and/or in similar or
 * successor clauses in the FAR, DOD or NASA FAR Supplement. Unpublished -
 * rights reserved under the Copyright Laws of the United States.
 */
include <stdio.h> define     TRUE    1
define     FALSE   0 ifndef     EXTERN
define     EXTERN extern
#endif

/*
 * Structure that defines a range of bits within a component
 */
typedef struct {
    int compnum;
    int width;
    int position;
    int filler;
```

```c
} bitset;

/*
 * Structure that defines the start bit number and width of a component
 */
typedef struct {
    int   base;
    int   width;
} component_stats;

/*
 * Structure to record when and how a given mux was set
 */
typedef struct {
    int   inst_num;
    int   mux_sel;
} mux_record;

/* Component IDs */
#define     RED_COMP    0
#define     GREEN_COMP  1
#define     BLUE_COMP   2
#define     ALPHA_COMP  3
#define     ZERO_COMP   4
#define     ONE_COMP    5
#define     HOLD_COMP   6
```

```
#define     NUM_COMP_TYPES       7

/* Precision information */
#define     UNSIGNED_PREC        10
define     BUSWIDTH        32 define MAX_WIDTH          13
define     DEFAULT_WIDTH        8
#define     DEFAULT_HIGH_BIT     10
#define     MAX_INST_COUNT            32
#define     MUX_UBITS       6
#define     NEXT_UBITS           5
#define     TOTAL_UBITS          320

/* Mux Enable and Select values for each output bit */
#define     ALPHA_BASE      0
#define     ALPHA_WIDTH     11
#define     BLUE_BASE 11
#define     BLUE_WIDTH      13
#define     GREEN_BASE      24
#define     GREEN_WIDTH     13
#define     RED_BASE   37
#define     RED_WIDTH       13
#define     DATA_WIDTH      50
#define     ZERO_BASE 50
#define     ZERO_WIDTH      1
#define     ONE_BASE   51
#define     ONE_WIDTH       1
```

```
#define      HOLD_BASE              52
define      HOLD_WIDTH             1 define UNPACKER_ZERO 32
define      UNPACKER_ONE    33
define      UNPACKER_HOLD 34 define      UNPACKER_DITHER_BASE      35
define      UNPACKER_DITHER_WIDTH     3 define      FILLER_FLAG      0x80
```

```c
/*
 * Internal storage format for packer instructions
 */
typedef struct {
    unsigned char     next;
    unsigned char     consume;
    unsigned char     produce;
    unsigned char     mux_sel[BUSWIDTH];
} packer_instruction;

/*
 * Internal storage format for unpacker instructions
 */
typedef struct {
    unsigned char     next;
    unsigned char     consume;
```

```
    unsigned char      produce;
    unsigned char      mux_sel[DATA_WIDTH];
} unpacker_instruction;

/*
 * Unpacker filler mode
 */ define FILL_MODE_ZERO          (0)
define FILL_MODE_REPLICATE (1)
#define FILL_MODE_DITHER    (2)
/*
 * Global variables
 */
EXTERN    char      *progname;
EXTERN    int       lineno;
EXTERN    int       default_width;
EXTERN    int       fill_mode;
EXTERN    int       high_bit;
EXTERN    int       verbose;
EXTERN    int       binary_output;
EXTERN    char      *source_file;
EXTERN    char      *output_file;
/*
 * Code entry points
 */
extern void   do_pixclock();
extern void   do_reset();
```

```
extern void    do_wrap(const char *s);
extern void    do_component(bitset comp);
extern void    define_label(const char *s);
extern char    *strsave(const char *s);
extern void    set_const_val(int comp, int val);
``` packc.y program listing

```
%{
#include "packc.h"
%}
%union {
    int        intval;
    bitset     bitval;
    char *strval;
}

%token    <intval>     NUMBER, DEFWID, REPHIGH, ZEROFILL, DITHER, MSB
%token    <intval>     CONST_R, CONST_G, CONST_B, CONST_A
%token    <intval>     RED, GREEN, BLUE, ALPHA, ZERO, ONE, HOLD, WRAP, RESET
%token    <strval>     IDENTIFIER
%type <bitval>    component
%type <intval>    comp
%%
file: statements            {}
```

```
                ;

statements:     /* Empty */
        |   statements DEFWID NUMBER        { default_width = $3; }
        |   statements MSB NUMBER           { high_bit = $3; }
        |   statements REPHIGH              { fill_mode = FILL_MODE_REPLICATE;
}
        |   statements ZEROFILL             { fill_mode = FILL_MODE_ZERO; }
        |   statements DITHER           { fill_mode = FILL_MODE_DITHER; }
        |   statements CONST_R NUMBER       { set_const_val(RED_COMP,$3); }
        |   statements CONST_G NUMBER       { set_const_val(GREEN_COMP,$3); }
        |   statements CONST_B NUMBER       { set_const_val(BLUE_COMP,$3); }
        |   statements CONST_A NUMBER       { set_const_val(ALPHA_COMP,$3); }
        |   statements RESET            { do_reset(); }
        |   statements WRAP IDENTIFIER      { do_wrap($3); }
        |     statements IDENTIFIER ':'     { define_label($2); }
        |   statements component            { do_component($2); }
        |   statements ';'              { do_pixclock(); }
        ;

component:  comp                        { $$.compnum = $1;
                                $$.width = default_width;
```